(12) United States Patent
Bai et al.

(10) Patent No.: US 11,972,606 B2
(45) Date of Patent: Apr. 30, 2024

(54) AUTONOMOUS VEHICLE LANE BOUNDARY DETECTION SYSTEMS AND METHODS

(71) Applicant: UATC, LLC, Mountain View, CA (US)

(72) Inventors: Min Bai, Toronto (CA); Gellert Sandor Mattyus, Toronto (CA); Namdar Homayounfar, Toronto (CA); Shenlong Wang, Toronto (CA); Shrinidihi Kowshika Lakshmikanth, Toronto (CA); Raquel Urtasun, Toronto (CA)

(73) Assignee: UATC, LLC, Mountain View, CA (US)

(*) Notice: Subject to any disclaimer, the term of this patent is extended or adjusted under 35 U.S.C. 154(b) by 0 days.

(21) Appl. No.: 18/313,794

(22) Filed: May 8, 2023

(65) Prior Publication Data

US 2023/0274540 A1 Aug. 31, 2023

Related U.S. Application Data

(63) Continuation of application No. 17/359,031, filed on Jun. 25, 2021, now Pat. No. 11,682,196, which is a
(Continued)

(51) Int. Cl.
*G06K 9/00* (2022.01)
*G01S 7/48* (2006.01)
(Continued)

(52) U.S. Cl.
CPC ............ *G06V 10/82* (2022.01); *G01S 7/4808* (2013.01); *G01S 17/86* (2020.01); *G01S 17/89* (2013.01);
(Continued)

(58) Field of Classification Search
CPC ............... G05D 1/0221; G05D 1/0231; G05D 2201/0213; G06K 9/00798; G06K 9/6262
See application file for complete search history.

(56) References Cited

U.S. PATENT DOCUMENTS 7,272,474 B1 * 9/2007 Stentz ................. G01C 7/04
701/28
7,675,655 B2 * 3/2010 Marshall ............... G06T 3/4038
382/104

(Continued)

OTHER PUBLICATIONS

Manz, Michael, et al. "Detection and tracking of road networks in rural terrain by fusing vision and LIDAR." 2011 IEEE/RSJ International Conference on Intelligent Robots and Systems. IEEE, 2011. (Year: 2011).*

(Continued)

*Primary Examiner* — Avinash Yentrapati
(74) *Attorney, Agent, or Firm* — Dority & Manning, P.A.

(57) ABSTRACT

Systems and methods for facilitating communication with autonomous vehicles are provided. In one example embodiment, a computing system can obtain a first type of sensor data (e.g., camera image data) associated with a surrounding environment of an autonomous vehicle and/or a second type of sensor data (e.g., LIDAR data) associated with the surrounding environment of the autonomous vehicle. The computing system can generate overhead image data indicative of at least a portion of the surrounding environment of the autonomous vehicle based at least in part on the first and/or second types of sensor data. The computing system can determine one or more lane boundaries within the surrounding environment of the autonomous vehicle based at least in part on the overhead image data indicative of at
(Continued)

least the portion of the surrounding environment of the autonomous vehicle and a machine-learned lane boundary detection model.

20 Claims, 8 Drawing Sheets

Related U.S. Application Data continuation of application No. 16/122,413, filed on Sep. 5, 2018, now Pat. No. 11,080,537.

(60) Provisional application No. 62/586,741, filed on Nov. 15, 2017.

(51) Int. Cl.
| | |
|---|---|
| *G01S 17/86* | (2020.01) |
| *G01S 17/89* | (2020.01) |
| *G01S 17/931* | (2020.01) |
| *G05D 1/00* | (2006.01) |
| *G06F 18/21* | (2023.01) |
| *G06N 3/04* | (2023.01) |
| *G06N 3/08* | (2023.01) |
| *G06V 10/82* | (2022.01) |
| *G06V 20/56* | (2022.01) |

(52) U.S. Cl.
CPC .......... *G01S 17/931* (2020.01); *G05D 1/0221* (2013.01); *G05D 1/0231* (2013.01); *G06F 18/217* (2023.01); *G06N 3/04* (2013.01); *G06N 3/08* (2013.01); *G06V 20/588* (2022.01); *G05D 2201/0213* (2013.01)

(56) References Cited

U.S. PATENT DOCUMENTS

| | | | | |
|---|---|---|---|---|
| 9,145,139 | B2* | 9/2015 | Ferguson | B60W 60/0016 |
| 10,055,651 | B2* | 8/2018 | Chundrlik | G08G 1/165 |
| 10,121,082 | B2* | 11/2018 | Heisele | B60R 1/00 |
| 10,509,121 | B2* | 12/2019 | Smith | G01S 13/87 |
| 2006/0215935 | A1* | 9/2006 | Oldroyd | G06V 20/13 |
| | | | | 382/294 |
| 2007/0002040 | A1* | 1/2007 | Oldroyd | G01C 11/00 |
| | | | | 345/419 |
| 2010/0020066 | A1* | 1/2010 | Dammann | G06T 19/00 |
| | | | | 345/419 |
| 2010/0254612 | A1* | 10/2010 | Oldroyd | G06T 7/30 |
| | | | | 382/209 |
| 2010/0328644 | A1* | 12/2010 | Lu | G01S 7/4865 |
| | | | | 356/5.01 |
| 2012/0179635 | A1* | 7/2012 | Vasudevan | G06T 7/521 |
| | | | | 703/2 |
| 2012/0274505 | A1* | 11/2012 | Pritt | G01S 13/904 |
| | | | | 342/25 A |
| 2014/0379247 | A1* | 12/2014 | Ferguson | G06V 20/588 |
| | | | | 701/301 |
| 2016/0325753 | A1* | 11/2016 | Stein | B60W 50/0097 |
| 2017/0032196 | A1* | 2/2017 | Gupta | G06V 10/806 |
| 2017/0300763 | A1* | 10/2017 | Zou | H04N 7/181 |
| 2018/0082589 | A1* | 3/2018 | Park | B60W 60/0015 |
| 2018/0099663 | A1* | 4/2018 | Diedrich | B60W 40/072 |
| 2018/0259958 | A1* | 9/2018 | Kalanick | G05D 1/0022 |
| 2018/0299900 | A1* | 10/2018 | Bae | G06V 10/751 |
| 2018/0322640 | A1* | 11/2018 | Kim | G06T 5/002 |
| 2018/0373263 | A1* | 12/2018 | Gray | G08G 1/165 |
| 2019/0005667 | A1* | 1/2019 | Khawaja | G06T 7/536 |
| 2019/0049987 | A1* | 2/2019 | Djuric | G06N 3/08 |
| 2019/0063945 | A1* | 2/2019 | Liu | G01C 21/3658 |
| 2019/0066512 | A1* | 2/2019 | Liu | G06V 20/588 |
| 2019/0138024 | A1* | 5/2019 | Liang | G01C 21/3878 |
| 2019/0155973 | A1* | 5/2019 | Morczinek | G06N 20/00 |
| 2020/0089232 | A1* | 3/2020 | Gdalyahu | G01C 21/3889 |

OTHER PUBLICATIONS

Bailo, et al., Robust road marking detection and recognition using density based grouping and machine learning techniques. In WACV, 2017, 10 pages.

Bayerl et al, "Detection and Tracking of Rural Crossroads Combining Vision and LiDAR Measurements", International Conference on Intelligent Transportation Systems, Oct. 8-11, 2014, Qingdao, China.

Caltagirone, et al. Fast LIDAR-based road detection using fully convolutional neural networks. In IEEE Intelligent Vehicles Symposium, 2017, 6 pages.

Chaurasia, et al., Linknet: Exploiting encoder representations for efficient semantic segmentation. arXiv preprint arXiv:1707.03718, 2017, 5 pages.

Ghias, et al., Laplacian Pyramid Reconstruction and Refinement for Semantic Segmentation. In ECCV, 2016, 16 pages.

Gurghian, et al., Deeplanes: End-to-end lane position estimation using deep neural networks. In CVPR Workshop, 2016, 8 pages.

H. Zhao, et al., Pyramid scene parsing network. 2017, 10 pages.

Haloi, et al., A robust lane detection and departure warning system. In IEEE Intelligent Vehicles Symposium, 2015, 6 pages.

Hata, et al., Road marking detection using LIDAR reflective intensity data and its application to vehicle localization. In IEEE International Conference on Intelligent Transportation Systems, 2014, 7 pages.

He, et al., Accurate and robust lane detection based on dual-view convolutional neutral network. In IEEE Intelligent Vehicles Symposium, 2016, 6 pages.

He, et al., Deep residual learning for image recognition. In CVPR, 2016, 9 pages.

Hur, et al., Multi-lane detection in urban driving environments using conditional random fields. In IEEE Intelligent Vehicles Symposium, 2013, 6 pages.

Huval, et al., An empirical evaluation of deep learning on highway driving. arXiv preprint arXiv:1504.01716, 2015, 7 pages.

Hyeon, et al., Robust road marking detection using convex grouping method in around-view monitoring system. In IEEE Intelligent Vehicles Symposium, 2016, 6 pages.

Jaderberg, et al., Spatial transformer networks. In NIPS, 2015, 9 pages.

Jung, et al., An efficient lane detection algorithm for lane departure detection. In IEEE Intelligent Vehicles Symposium, 2013, 6 pages.

Kheyrollahi, et al., Automatic real-time road marking recognition using a feature driven approach. Machine Vision and Applications, 23, 2012, 11 pages.

Kim, et al., End-to-end ego lane estimation based on sequential transfer learning for self-driving cars. In CVPR Workshop, 2017, 9 pages.

Kingma, et al., Adam: A method for stochastic optimization. ICLR, 2015, 15 pages.

Lee, et al., Vpgnet: Vanishing point guided network for lane and road marking detection and recognition. In ICCV, 2017, 9 pages.

Lin, et al., Feature pyramid networks for object detection. In CVPR, 2017, 9 pages.

Lindner, et al., Multi-channel LIDAR processing for lane detection and estimation. In IEEE International Conference on Intelligent Transportation Systems, 2009, 6 pages.

Long, et al., Fully convolutional networks for semantic segmentation. In CVPR, 2015, 10 pages.

Manz, "Detection and tracking of road networks in rural terrain by fusing vision and LIDAR." 2011 IEEE/RSJ International Conference on Intelligent Robots and Systems. IEEE, 2011.

Thuy, et al., Lane detection and tracking based on LIDAR data. In Metrology and Measurement Systems, 2010, 11 pages.

(56) References Cited

OTHER PUBLICATIONS

Wu, et al., A practical system for road marking detection and recognition. In IEEE Intelligent Vehicles Symposium, 2012, 6 pages.

Zhang, et al., A lane marking extraction approach based on random finite set statistics. In IEEE Intelligent Vehicles Symposium, 2013, 6 pages.

* cited by examiner

AUTONOMOUS VEHICLE LANE BOUNDARY DETECTION SYSTEMS AND METHODS

PRIORITY CLAIM

The present application is a continuation of U.S. application Ser. No. 17/359,031, filed Jun. 25, 2021. U.S. application Ser. No. 17/359,031 is hereby incorporated by reference herein in its entirety. U.S. application Ser. No. 17/359,031 is a continuation of U.S. application Ser. No. 16/122,413, filed Sep. 5, 2018. U.S. application Ser. No. 16/122,413 is hereby incorporated by reference herein in its entirety. U.S. application Ser. No. 16/122,413 claims priority to U.S. Provisional Application No. 62/586,741 filed Nov. 15, 2017. U.S. Provisional Application No. 62/586,741 is hereby incorporated by reference herein in its entirety.

FIELD

The present disclosure relates generally to detecting lane boundaries within the surrounding environment of an autonomous vehicle.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system includes one or more processors and one or more tangible, non-transitory, computer readable media that collectively store instructions that when executed by the one or more processors cause the computing system to perform operations. The operations include obtaining a first type of sensor data associated with a surrounding environment of an autonomous vehicle and a second type of sensor data associated with the surrounding environment of the least a portion of the surrounding environment of the autonomous vehicle based at least in part on the first type of sensor data and the second type of sensor data. The operations include accessing data indicative of a machine-learned lane boundary detection model. The operations include inputting the overhead image data indicative of at least the portion of the surrounding environment of the autonomous vehicle into the machine-learned lane boundary detection model. The operations include obtaining an output from the machine-learned lane boundary detection model. The output is indicative of one or more lane boundaries within the surrounding environment of the autonomous vehicle.

Another example aspect of the present disclosure is directed to a computer-implemented method of detecting lane boundaries. The method includes obtaining, by a computing system including one or more computing devices, a first type of sensor data associated with a surrounding environment of an autonomous vehicle. The method includes determining, by the computing system, a multi-dimensional feature volume of the first type of sensor data based at least in part on a first machine-learned model and the first type of sensor data. The method includes obtaining, by the computing system, a second type of sensor data associated with the surrounding environment of the autonomous vehicle. The method includes determining, by the computing system, a ground height estimation associated with the surrounding environment of the autonomous vehicle based at least in part on a second machine-learned model and the second type of sensor data. The method includes generating, by the computing system, overhead image data indicative of at least a portion of the surrounding environment of the autonomous vehicle based at least in part on the multi-dimensional feature volume and the ground height estimation. The method includes determining, by the computing system, one or more lane boundaries within the surrounding environment of the autonomous vehicle based at least in part on the overhead image data and a third machine-learned model.

Yet another example aspect of the present disclosure is directed to an autonomous vehicle. The autonomous vehicle includes one or more processors and one or more tangible, non-transitory, computer readable media that collectively store instructions that when executed by the one or more processors cause the autonomous vehicle to perform operations. The operations include obtaining camera image data associated with a surrounding environment of the autonomous vehicle and LIDAR data associated with the surrounding environment of the least a portion of the surrounding environment of the autonomous vehicle based at least in part on the camera image data and the LIDAR data. The operations include determining one or more lane boundaries within the surrounding environment of the autonomous vehicle based at least in part on the overhead image data indicative of at least the portion of the surrounding environment of the autonomous vehicle and a machine-learned lane boundary detection model.

Other example aspects of the present disclosure are directed to systems, methods, vehicles, apparatuses, tangible, non-transitory computer-readable media, and memory devices for detecting lane boundaries and/or other markings.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
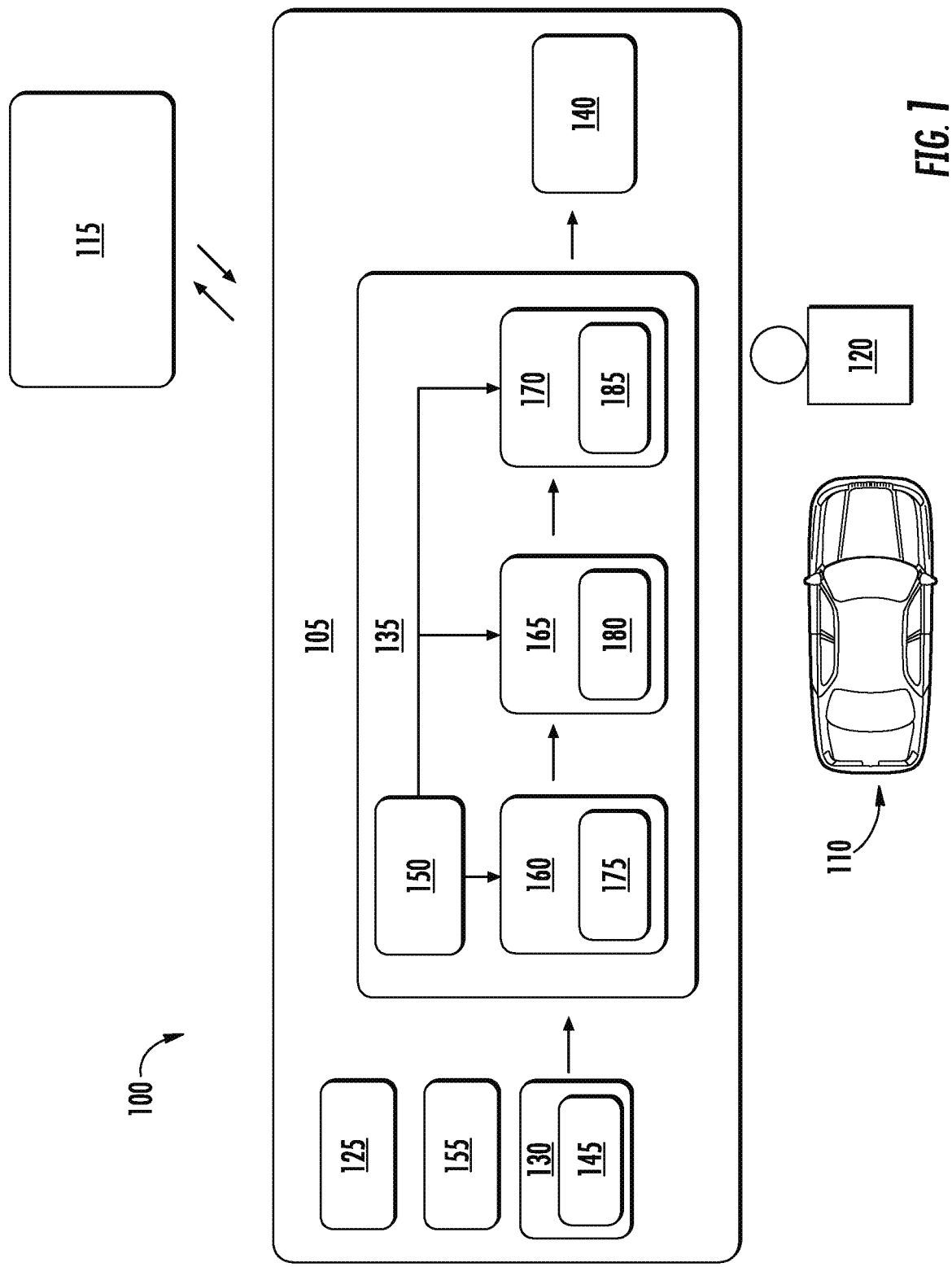
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

The present disclosure is directed to improved systems and methods for detecting lane boundaries by autonomous vehicles or other markings by other computing systems. For example, lane boundaries can include, for example, lane markings and/or other indicia associated with a travel lane and/or travel way (e.g., the boundaries thereof). For safe operation, it is important for autonomous vehicles to reliably detect the lane boundaries of its current lane for accurate localization, while also estimating the nearby lanes for maneuvering. Moreover, accurate detections of lane boundaries can help guide an autonomous vehicle's detection and tracking of other traffic participants as well as the planning of its motion.

The systems and methods of the present disclosure provide an improved approach for detecting lane boundaries within the surrounding environment of an autonomous vehicle based on various types of sensor data. For instance, an autonomous vehicle can obtain camera image data and Light Detection and Ranging (LIDAR) data via its onboard cameras and LIDAR system. This sensor data can depict at least a portion of the vehicle's surrounding environment. The autonomous vehicle can pre-process the camera image data and the LIDAR data to generate input data to be used with a machine-learned lane boundary detection model (e.g., a convolutional neural network). For instance, the autonomous vehicle can pre-process the camera image data and the LIDAR data (e.g., using one or more other machine-learned models) to generate overhead image data that is indicative of an overhead, bird's eye view of a portion of the vehicle's surrounding environment. The overhead image data can be feed into the machine-learned lane boundary detection model, which can be trained to accurately detect one or more lane boundaries within the surrounding environment based on the overhead image data. Additionally, or alternatively, the LIDAR data can be inputted into the machine-learned lane boundary detection model for accurate lane boundary detection. An autonomous vehicle can utilize the detected lane boundaries to improve its performance of various actions such as, for example, localizing itself within its surroundings, perceiving object(s) (e.g., nearby vehicles, bicycles, pedestrians, etc.), predicting the motion of such object(s), and/or planning vehicle motion.

More particularly, an autonomous vehicle can be a ground-based autonomous vehicle (e.g., car, truck, bus, etc.) or another type of vehicle (e.g., aerial vehicle) that can operate with minimal and/or no interaction from a human operator. An autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors (e.g., cameras, Light Detection and Ranging (LIDAR), Radio Detection and Ranging (RADAR), etc.), an autonomy computing system (e.g., for determining autonomous navigation), one or more vehicle control systems (e.g., for controlling braking, steering, powertrain, etc.), and/or other systems. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment.

To help safely and confidently operate within its surrounding environment, the vehicle's computing system can be configured to utilize various types of sensor data to detect one or more lane boundaries. For instance, the vehicle computing system can obtain a first type of sensor data and a second type of sensor data. The first type of sensor data can include camera image data associated with the surrounding environment for the autonomous vehicle. The camera image data can be, for example, monocular, 3-channel RGB image data (e.g., with 960×300 resolution, etc.). The camera image data can depict at least a portion of the surrounding environment of the autonomous vehicle (e.g., a portion that is expected to include lane boundaries, etc.). The second type of sensor data can include LIDAR data associated with the surrounding environment of the autonomous vehicle. The LIDAR data can be indicative of a LIDAR point cloud associated with the surrounding environment of the autonomous vehicle (e.g., created by LIDAR sweep(s) of the vehicle's LIDAR system) that has been rasterized. For example, the vehicle computing system can rasterize the LIDAR point cloud into a two-dimensional overhead view image (e.g., with a resolution of 960×960 at a 5 cm per pixel resolution). The overhead view image can depict at least a portion of the surrounding environment (e.g., a 48 m by 48 m area with the vehicle at the center bottom of the image). Moreover, the rasterized LIDAR data (e.g., the overhead view image) can include one or more spatial locations. Each spatial location can contain a plurality of channels. For example, each spatial location can include a first channel representing the height of at least one pixel (e.g., the highest pixel in a discretization bin), a second channel representing a brightness level of the least one pixel (e.g., in the discretization bin), and a third channel representing a total number of points (e.g., within the discretization bin).

In some implementations, the vehicle computing system can obtain other types of data. For instance, the vehicle computing system can obtain Radio Detection and Ranging (RADAR) data, motion sensor data (e.g., data from inertial measurement unit(s), wheel odometry readings, etc.), and/or other types of sensor data. Such sensor data can be acquired via one or more of the sensors onboard the autonomous vehicle.

The vehicle computing system can pre-process the sensor data in order help improve the accuracy of its lane detection analysis. For instance, the vehicle computing system can generate overhead image data indicative of at least a portion of the surrounding environment of the autonomous vehicle based at least in part on the first type of sensor data (e.g., camera image data) and the second type of sensor data (e.g., LIDAR data). To do so, the vehicle computing system can include, employ, and/or otherwise leverage one or more machine-learned model(s). The machine-learned models can be or can otherwise include one or more various model(s) such as, for example, neural networks (e.g., deep neural networks), and/or other multi-layer non-linear models. The machine-learned models can include convolutional neural networks and/or other forms of neural networks.

To help create the overhead image data, the vehicle computing system can utilize a first machine-learned model to transform the camera image data. The first machine-learned model can be a machine-learned feature projection model (e.g., a convolutional neural network) that is trained to generate a multi-dimensional feature volume based at least in part on a set of sensor data. By way of example, the vehicle computing system can access the machine-learned feature projection model (e.g., from a local memory onboard the vehicle, from a memory that is remote from the vehicle, etc.). The vehicle computing system can input the camera image data into the machine-learned feature projection model and obtain an output that is indicative a multi-dimensional feature volume of the camera image data. For example, the machine-learned feature projection model can project the camera image data into a multi-dimensional feature volume (e.g., a sixteen-dimensional feature volume).

In order to be able to generate the overhead image data from the multi-dimensional feature volume of the camera image data, the vehicle computing system can utilize a second machine-learned model to estimate a ground height of the surrounding environment. For instance, the second machine-learned model can be a machine-learned ground height estimation model that is trained to determine a ground height estimation of the surrounding environment based at least in part on a set of sensor data. By way of example, the vehicle computing system can access the machine-learned ground height estimation model (e.g., from a local memory, from a remote memory, etc.). The vehicle computing system can input the LIDAR data into the machine-learned ground height estimation model and obtain an output that is indicative of the ground height estimation. For example, the machine-learned ground height estimation model can predict the ground height in an overhead view from the rasterized LIDAR data. The vehicle computing system can project the multi-dimensional feature volume of the camera image data onto the ground height estimation (determined using the LIDAR data) to generate the overhead image data.

The vehicle computing system can detect one or more lane boundaries within the surrounding environment of the autonomous vehicle based at least in part on the overhead image data and a third machine-learned model. To do so, the vehicle computing system can include, employ, and/or otherwise leverage a machine-learned lane boundary detection model (e.g., a convolutional neural network). In some implementations, the machine-learned lane boundary detection model can be or otherwise include an object segmentation neural network. For example, a pre-trained object segmentation neural network can be modified to add a plurality of parallel pooling operations (e.g., three pooling operations, etc.) at the end of a decoder (e.g., the 5-th decoder, etc.) with various kernel and stride sizes (e.g., of 2, 4, 8, etc.). The results of these pooling operations can be concatenated with the output of the decoder (e.g., the 5th decoder) and passed through the decoder modules. This can allow the machine-learned lane boundary detection model to better extrapolate the one or more lane boundaries of further away regions. One example existing object segmentation neural network is LinkNet (see A. Chaurasia and E. Culurciello. Linknet: Exploiting encoder representations for efficient semantic segmentation. arXiv preprint arXiv:1707.03718, 2017).

The machine-learned lane boundary detection model can be trained to identify one or more lane boundaries within the surrounding environment of the autonomous vehicle based at least in part on a set of input data. The input data can include, for example, the overhead image data. The vehicle computing system can access data indicative of the machine-learned lane boundary detection model and input the overhead image data into the machine-learned lane boundary detection model. The vehicle computing system can obtain, from the machine-learned lane boundary detection model, an output indicative of the one or more lane boundaries within the surrounding environment of the autonomous vehicle. The output can be indicative of the position of the lane boundaries within a reference frame associated with the surrounding environment.

In some implementations, the vehicle computing system can provide additional input data into the machine-learned lane boundary detection model for the detection of the lane boundaries. For example, in some implementations, the vehicle computing system also input the LIDAR data into the machine-learned lane boundary detection model. For example, the re-projected image data can be concatenated with the rasterized LIDAR data and provided as input into the machine-learned lane boundary detection model (e.g., a modified object segmentation neural network). Additionally, or alternatively, the vehicle computing system can also input other types of sensor data into the machine-learned lane boundary detection model. For example, the vehicle computing system can provide motion sensor data (e.g., data from inertial measurement unit(s), wheel odometry readings, etc.) into the machine-learned lane boundary detection model. Such sensor aggregation can allow the machine-learned lane boundary detection model to aggregate the lane detection outputs over time, resulting in more temporally coherent detections.

In some implementations, the vehicle computing system can be configured to detect one or more lane boundaries within the surrounding environment of the autonomous vehicle based on the LIDAR data as the sole input. For example, the vehicle computing system can obtain the rasterized LIDAR data associated with a surrounding environment of an autonomous vehicle. The vehicle computing system can access data indicative of the machine-learned lane boundary detection model (e.g., from a local and/or remote memory). The vehicle computing system can input the rasterized LIDAR data into the machine-learned lane boundary detection model and obtain an output that is indicative of one or more lane boundaries within the surrounding environment of the autonomous vehicle.

The vehicle computing system can utilize the detected lane boundaries to perform one or more vehicle actions. For instance, the vehicle computing system can initiate the performance of one or more vehicle actions by the autonomous vehicle based at least in part on the one or more lane boundaries (e.g., via the transmission of control signal(s)). For example, the vehicle computing system can provide data indicative of the one or more lane boundaries (e.g., their associated position within the surrounding environment) for storage in a memory onboard and/or off-board of the vehicle. In another example, the vehicle computing system (e.g., a positioning system) can determine a location of the autonomous vehicle (e.g., within a travel lane on a highway) based at least in part on the one or more lane boundaries. Additionally, or alternatively, the vehicle computing system (e.g., a perception system) can perceive an object within the surrounding environment based at least in part on the one or more lane boundaries. For example, the lane boundaries can help the vehicle computing system determine that an object is more likely a vehicle than any other type of object because a vehicle is more likely (e.g., than a bicycle, pedestrian, etc.) to be within the travel lane on a highway. Additionally, or alternatively, the vehicle computing system (e.g., a prediction system) can predict a motion trajectory of an object within the surrounding environment of the autonomous vehicle based at least in part on the one or more lane boundaries. For example, the vehicle computing system can predict that another vehicle is more likely to travel in a manner such that the other vehicle will stay between the lane boundaries. Additionally, or alternatively, the vehicle computing system (e.g., a motion planning system) can plan a motion of the autonomous vehicle based at least in part on the one or more lane boundaries. For example, the vehicle computing system can generate a motion plan by which the autonomous vehicle is to travel between the lane boundaries (e.g., in a travel lane), queue for another object within the travel lane, pass an object outside of the travel lane, etc.

While the above describes the performance of the present lane detection techniques being performed onboard an autonomous vehicle, this is not intended to be limiting. As further described herein, the systems and methods of the present disclosure can be implemented off-board an autonomous vehicle (e.g., at a location remote therefrom).

The systems and methods described herein provide a number of technical effects and benefits. For instance, the present disclosure allows an autonomous vehicle to more accurately detect lane boundaries by using a series of improved models (e.g., neural network models, etc.) capable of leveraging combinations and subsets of sensor data, as well as temporal image sequences to produce centimeter level accurate lane predictions. Such an approach can allow for improved lane detection across a variety of scenarios including, for example, a highway scenario. Moreover, the systems and methods of the present disclosure provide a lane detection formulation that is robust to noise and encapsulates rich information at the pixel level. The detection models of the present disclosure allow for accurate reasoning about lane boundary positions even when they are not immediately evident from the sensors. This also provides for more accurate detection at longer distance. Such an approach can provide more reliable, flexible, and scalable solution than models with handcrafted rules, especially in less ideal scenarios like heavy occlusion.

The systems and methods of the present disclosure also provide an improvement to vehicle computing technology, such as autonomous vehicle computing technology. For instance, the systems and methods allow the vehicle technology to leverage the sensor data acquired by the autonomous vehicle to more accurately detect lane boundaries within the vehicle's surroundings. For example, a computing system (e.g., a vehicle computing system) can obtain a first type of sensor data (e.g., camera image data) and a second type of sensor data (e.g., LIDAR data) associated with a surrounding environment of an autonomous vehicle. The computing system can generate an overhead image data indicative of at least a portion of the surrounding environment of the autonomous vehicle based at least in part on the first and second types of sensor data. The computing system can access a machine-learned lane boundary detection model and input the overhead image data into the machine-learned lane boundary detection model. The vehicle computing system can obtain an output (from the machine-learned lane boundary detection model) that is indicative of one or more lane boundaries within the surrounding environment of the autonomous vehicle. By combining the different types of sensor data, the vehicle computing system can generate a more accurate representation of the surrounding environment (e.g., due to the inclusion of the ground height estimation). For example, the systems and methods of the present disclose can combine the strength of two distinct types of sensor data (e.g., camera's dense observations as well as LiDAR's unambiguous 3D measurements) to help provide a significant improvement (e.g., 18-45% increase in performance of lane detection) over other lane detection approaches.

Additionally, the use of overhead image data with the machine-learned lane boundary detection model can lead to more reliable lane boundary detection as the machine-learned lane boundary detection model can be configured to more precisely reason about the overhead image data. Even in the implementations where the machine-learned lane boundary detection model utilizes only the rasterized LIDAR data, the machine-learned lane boundary detection model can provide a more reliable detection of the lane boundaries within the vehicle's surrounding environment. Ultimately, the improvement of lane boundary detection results in an improvement in the vehicle autonomy operations (e.g., perception, prediction, motion planning, other autonomous navigation functions, etc.) as well as the safety of the vehicle and others.

Although the present disclosure is discussed with particular reference to autonomous vehicles and lane boundaries, the systems and methods described herein are applicable to the use of machine-learned models for other purposes. For example, the techniques described herein can be implemented and utilized by other computing systems such as, for example, user devices, robotic systems, non-autonomous vehicle systems, etc. (e.g., to detect other types of markings). Further, although the present disclosure is discussed with particular reference to certain networks, the systems and methods described herein can also be used in conjunction with many different forms of machine-learned models in addition or alternatively to those described herein. The reference to implementations of the present disclosure with respect to an autonomous vehicle is meant to be presented by way of example and is not meant to be limiting.

With reference now to the FIGS., example embodiments of the present disclosure will be discussed in further detail. FIG. 1 illustrates an example system 100 according to example embodiments of the present disclosure. The system 100 can include a vehicle computing system 105 associated with a vehicle 110. The system 100 can include an operations computing system 115 that is remote from the vehicle 110.

In some implementations, the vehicle 110 can be associated with an entity (e.g., a service provider, owner, manager). The entity can be one that offers one or more vehicle service(s) to a plurality of users via a fleet of vehicles that includes, for example, the vehicle 110. In some implementations, the entity can be associated with only vehicle 110 (e.g., a sole owner, manager). In some implementations, the operations computing system 115 can be associated with the entity. The vehicle 110 can be configured to provide one or more vehicle services to one or more users 120. The vehicle service(s) can include transportation services (e.g., rideshare services in which user rides in the vehicle 110 to be transported), courier services, delivery services, and/or other types of services. The vehicle service(s) can be offered to the users 120 by the entity, for example, via a software application (e.g., a mobile phone software application). The entity can utilize the operations computing system 115 to coordinate and/or manage the vehicle 110 (and its associated fleet, if any) to provide the vehicle services to a user 120.

The operations computing system 115 can include one or more computing devices that are remote from the vehicle 110 (e.g., located off-board the vehicle 110). For example, such computing device(s) can be components of a cloud-based server system and/or other type of computing system that can communicate with the vehicle computing system 105 of the vehicle 110 (and/or a user device). The computing device(s) of the operations computing system 115 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 115 (e.g., the one or more processors, etc.) to perform operations and functions, such as providing data to and/or obtaining data from the vehicle 110, for managing a fleet of vehicles (that includes the vehicle 110), etc.

The vehicle 110 incorporating the vehicle computing system 105 can be various types of vehicles. For instance, the vehicle 110 can be a ground-based autonomous vehicle such as an autonomous truck, autonomous car, autonomous bus, etc. The vehicle 110 can be an air-based autonomous vehicle (e.g., airplane, helicopter, or other aircraft) or other types of vehicles (e.g., watercraft, etc.). The vehicle 110 can be an autonomous vehicle that can drive, navigate, operate, etc. with minimal and/or no interaction from a human operator (e.g., driver). In some implementations, a human operator can be omitted from the vehicle 110 (and/or also omitted from remote control of the vehicle 110). In some implementations, a human operator can be included in the vehicle 110. In some implementations, the vehicle 110 can be a non-autonomous vehicle (e.g., ground-based, air-based, water-based, other vehicles, etc.).

In some implementations, the vehicle 110 can be configured to operate in a plurality of operating modes. The vehicle 110 can be configured to operate in a fully autonomous (e.g., self-driving) operating mode in which the vehicle 110 is controllable without user input (e.g., can drive and navigate with no input from a human operator present in the vehicle 110 and/or remote from the vehicle 110). The vehicle 110 can operate in a semi-autonomous operating mode in which the vehicle 110 can operate with some input from a human operator present in the vehicle 110 (and/or a human operator that is remote from the vehicle 110). The vehicle 110 can enter into a manual operating mode in which the vehicle 110 is fully controllable by a human operator (e.g., human driver, pilot, etc.) and can be prohibited and/or disabled (e.g., temporary, permanently, etc.) from performing autonomous navigation (e.g., autonomous driving). In some implementations, the vehicle 110 can implement vehicle operating assistance technology (e.g., collision mitigation system, power assist steering, etc.) while in the manual operating mode to help assist the human operator of the vehicle 110.

The operating modes of the vehicle 110 can be stored in a memory onboard the vehicle 110. For example, the operating modes can be defined by an operating mode data structure (e.g., rule, list, table, etc.) that indicates one or more operating parameters for the vehicle 110, while in the particular operating mode. For example, an operating mode data structure can indicate that the vehicle 110 is to autonomously plan its motion when in the fully autonomous operating mode. The vehicle computing system 105 can access the memory when implementing an operating mode.

The operating mode of the vehicle 110 can be adjusted in a variety of manners. For example, the operating mode of the vehicle 110 can be selected remotely, off-board the vehicle 110. For example, an entity associated with the vehicle 110 (e.g., a service provider) can utilize the operations computing system 115 to manage the vehicle 110 (and/or an associated fleet). The operations computing system 115 can send data to the vehicle 110 instructing the vehicle 110 to enter into, exit from, maintain, etc. an operating mode. By way of example, the operations computing system 115 can send data to the vehicle 110 instructing the vehicle 110 to enter into the fully autonomous operating mode. In some implementations, the operating mode of the vehicle 110 can be set onboard and/or near the vehicle 110. For example, the vehicle computing system 105 can automatically determine when and where the vehicle 110 is to enter, change, maintain, etc. a particular operating mode (e.g., without user input). Additionally, or alternatively, the operating mode of the vehicle 110 can be manually selected via one or more interfaces located onboard the vehicle 110 (e.g., key switch, button, etc.) and/or associated with a computing device proximate to the vehicle 110 (e.g., a tablet operated by authorized personnel located near the vehicle 110). In some implementations, the operating mode of the vehicle 110 can be adjusted by manipulating a series of interfaces in a particular order to cause the vehicle 110 to enter into a particular operating mode.

The vehicle computing system 105 can include one or more computing devices located onboard the vehicle 110. For example, the computing device(s) can be located on and/or within the vehicle 110. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 110 (e.g., its computing system, one or more processors, etc.) to perform operations and functions, such as those described herein for determining object motion, controlling vehicle motion, etc.

The vehicle 110 can include a communications system 125 configured to allow the vehicle computing system 105 (and its computing device(s)) to communicate with other computing devices. The vehicle computing system 105 can use the communications system 125 to communicate with the operations computing system 115 and/or one or more other computing device(s) over one or more networks (e.g., via one or more wireless signal connections). In some implementations, the communications system 125 can allow communication among one or more of the system(s) onboard the vehicle 110. The communications system 125 can include any suitable components for interfacing with one or more network(s), including, for example, transmitters, receivers, ports, controllers, antennas, and/or other suitable components that can help facilitate communication.

As shown in FIG. 1, the vehicle 110 can include one or more vehicle sensors 130, an autonomy computing system 135, one or more vehicle control systems 140, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 130 can be configured to acquire sensor data 145. This can include sensor data associated with the surrounding environment of the vehicle 110. For instance, the sensor data 145 can acquire image and/or other data within a field of view of one or more of the vehicle sensor(s) 130. The vehicle sensor(s) 130 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 145 can include image data, radar data, LIDAR data, and/or other data acquired by the vehicle sensor(s) 130. The vehicle 110 can also include other sensors configured to acquire data associated with the vehicle 110. For example, the vehicle can include inertial measurement unit(s), wheel odometry devices, and/or other sensors that can acquire data indicative of a past, present, and/or future state of the vehicle 110.

In some implementations, the sensor data 145 can be indicative of one or more objects within the surrounding environment of the vehicle 110. The object(s) can include, for example, vehicles, pedestrians, bicycles, and/or other objects. The object(s) can be located in front of, to the rear of, to the side of the vehicle 110, etc. The sensor data 145 can be indicative of locations associated with the object(s) within the surrounding environment of the vehicle 110 at one or more times. The vehicle sensor(s) 130 can provide the sensor data 145 to the autonomy computing system 135.

In addition to the sensor data 145, the autonomy computing system 135 can retrieve or otherwise obtain map data 150. The map data 150 can provide detailed information about the surrounding environment of the vehicle 110. For example, the map data 150 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 110 in comprehending and perceiving its surrounding environment and its relationship thereto. In some implementations, the vehicle computing system 105 can determine a vehicle route for the vehicle 110 based at least in part on the map data 150.

The vehicle 110 can include a positioning system 155. The positioning system 155 can determine a current position of the vehicle 110. The positioning system 155 can be any device or circuitry for analyzing the position of the vehicle 110. For example, the positioning system 155 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 110 can be used by various systems of the vehicle computing system 105 and/or provided to a remote computing device (e.g., of the operations computing system 115). For example, the map data 150 can provide the vehicle 110 relative positions of the surrounding environment of the vehicle 104. The vehicle 110 can identify its position within the surrounding environment (e.g., across six axes) based at least in part on the data described herein. For example, the vehicle 110 can process the vehicle sensor data 145 (e.g., LIDAR data, camera data) to match it to a map of the surrounding environment to get an understanding of the vehicle's position within that environment.

The autonomy computing system 135 can include a perception system 160, a prediction system 165, a motion planning system 170, and/or other systems that cooperate to perceive the surrounding environment of the vehicle 110 and determine a motion plan for controlling the motion of the vehicle 110 accordingly. For example, the autonomy computing system 135 can obtain the sensor data 145 from the vehicle sensor(s) 130, process the sensor data 145 (and/or other data) to perceive its surrounding environment, predict the motion of objects within the surrounding environment, and generate an appropriate motion plan through such surrounding environment. The autonomy computing system 135 can control the one or more vehicle control systems 140 to operate the vehicle 110 according to the motion plan.

The vehicle computing system 105 (e.g., the autonomy system 135) can identify one or more objects that are proximate to the vehicle 110 based at least in part on the sensor data 130 and/or the map data 150. For example, the vehicle computing system 105 (e.g., the perception system 160) can process the sensor data 145, the map data 150, etc. to obtain perception data 175. The vehicle computing system 105 can generate perception data 175 that is indicative of one or more states (e.g., current and/or past state(s)) of a plurality of objects that are within a surrounding environment of the vehicle 110. For example, the perception data 175 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 160 can provide the perception data 175 to the prediction system 165 (and/or the motion planning system 170).

The prediction system 165 can be configured to predict a motion of the object(s) within the surrounding environment of the vehicle 110. For instance, the prediction system 165 can generate prediction data 180 associated with such object(s). The prediction data 180 can be indicative of one or more predicted future locations of each respective object. For example, the prediction system 180 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 180 can be indicative of the speed and/or acceleration at which the respective object is predicted to travel along its associated predicted motion trajectory. The predictions system 165 can output the prediction data 180 (e.g., indicative of one or more of the predicted motion trajectories) to the motion planning system 170.

The vehicle computing system 105 (e.g., the motion planning system 170) can determine a motion plan 185 for the vehicle 110 based at least in part on the perception data 175, the prediction data 180, and/or other data. A motion plan 185 can include vehicle actions (e.g., planned vehicle trajectories, speed(s), acceleration(s), other actions, etc.) with respect to one or more of the objects within the surrounding environment of the vehicle 110 as well as the objects' predicted movements. For instance, the motion planning system 170 can implement an optimization algorithm, model, etc. that considers cost data associated with a vehicle action as well as other objective functions (e.g., cost functions based on speed limits, traffic lights, etc.), if any, to determine optimized variables that make up the motion plan 185. The motion planning system 170 can determine that the vehicle 110 can perform a certain action (e.g., pass an object) without increasing the potential risk to the vehicle 110 and/or violating any traffic laws (e.g., speed limits, lane boundaries, signage, etc.). For instance, the motion planning system 170 can evaluate one or more of the predicted motion trajectories of one or more objects during its cost data analysis as it determines an optimized vehicle trajectory through the surrounding environment. The motion planning system 185 can generate cost data associated with such trajectories. In some implementations, one or more of the predicted motion trajectories may not ultimately change the motion of the vehicle 110 (e.g., due to an overriding factor such as a jaywalking pedestrian). In some implementations, the motion plan 185 may define the vehicle's motion such that the vehicle 110 avoids the object(s), reduces speed to give more leeway to one or more of the object(s), proceeds cautiously, performs a stopping action, etc.

The motion planning system 170 can be configured to continuously update the vehicle's motion plan 185 and a corresponding planned vehicle motion trajectory. For example, in some implementations, the motion planning system 170 can generate new motion plan(s) 185 for the vehicle 110 (e.g., multiple times per second). Each new motion plan can describe a motion of the vehicle 110 over the next planning period (e.g., next several seconds). Moreover, a new motion plan may include a new planned vehicle motion trajectory. Thus, in some implementations, the motion planning system 170 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 110.

The vehicle computing system 105 can cause the vehicle 110 to initiate a motion control in accordance with at least a portion of the motion plan 185. For instance, the motion plan 185 can be provided to the vehicle control system(s) 140 of the vehicle 110. The vehicle control system(s) 140 can be associated with a vehicle controller (e.g., including a vehicle interface) that is configured to implement the motion plan 185. The vehicle controller can, for example, translate the motion plan into instructions for the appropriate vehicle control component (e.g., acceleration control, brake control, steering control, etc.). By way of example, the vehicle controller can translate a determined motion plan 185 into instructions to adjust the steering of the vehicle 110 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 185 (e.g., by sending control signal(s), making the translated plan available, etc.). This can allow the vehicle 110 to autonomously travel within the vehicle's surrounding environment.

Figure 2:
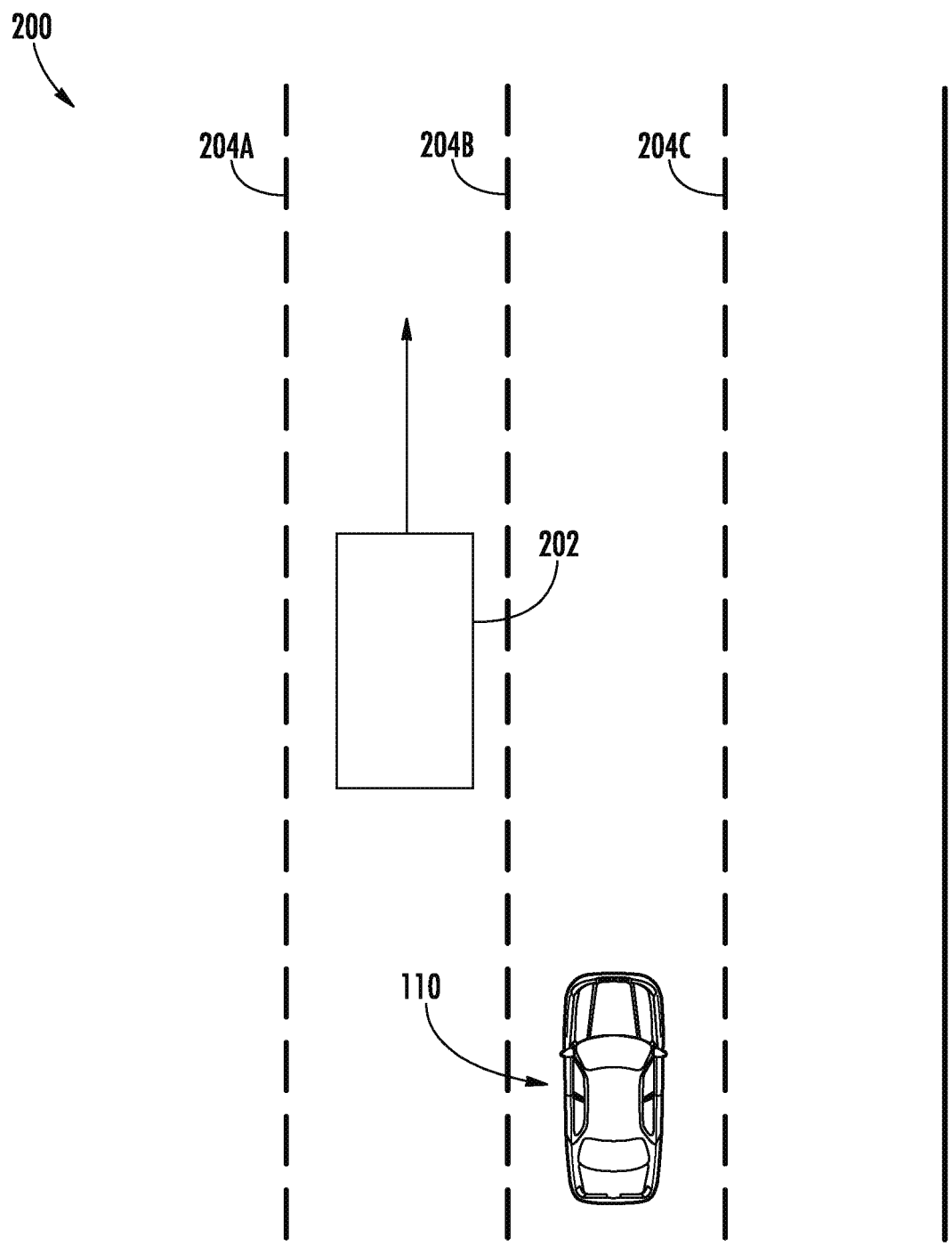
FIG. 2 depicts an example environment of an autonomous vehicle according to example embodiments of the present disclosure.

FIG. 2 depicts an example environment 200 of the vehicle 110 according to example embodiments of the present disclosure. The surrounding environment 200 of the vehicle 110 can be, for example, a highway environment, an urban environment, a residential environment, a rural environment, and/or other types of environments. The surrounding environment 200 can include one or more objects such as an object 202 (e.g., another vehicle, etc.). The surrounding environment 200 can include one or more lane boundaries 204A-C. As described herein, the lane boundaries 204A-C can include, for example, lane markings and/or other indicia associated with a travel lane and/or travel way (e.g., the boundaries thereof). For example, the one or more lane boundaries 204A-C can be located within a highway on which the vehicle 110 is located. The vehicle 110 can be configured to reliably detect the one or more lane boundaries 204A-C using the systems and methods of the present disclosure.

Figure 3:
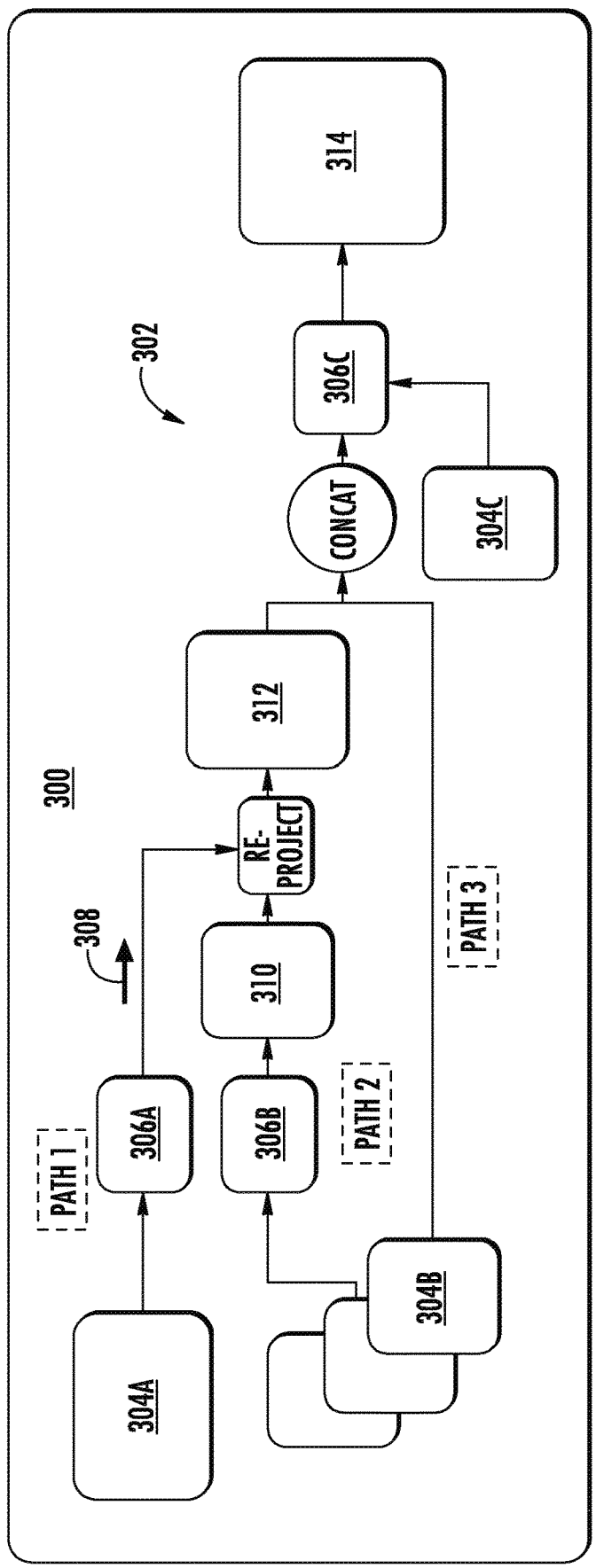
FIG. 3 depicts a diagram of an example computing system with a model architecture according to example embodiments of the present disclosure.

FIG. 3 depicts a diagram of an example computing system 300 that is configured to detect the one or more lane boundaries 204A-C of the vehicle's surrounding environment. The computing system 300 can be located onboard the vehicle 110 (e.g., as at least a portion of the vehicle computing system 105) and/or can be located off-board the vehicle 110 (e.g., remote from the vehicle computing system 105). The computing system 300 can include one or more computing devices. The computing devices can implement the model architecture 302 to detect lane boundaries. For example, the computing system 300 can include one or more processors and one or more tangible, non-transitory, computer readable media that collectively store instructions that when executed by the one or more processors cause the computing system to perform the operations described herein for detecting lane boundaries 204A-C within the surrounding environment 200 of the vehicle 110 (e.g., the processing pipeline operations of the model architecture 302).

The computing system 300 can be configured to utilize various types of sensor data to detect one or more lane boundaries. For instance, the computing system 300 can obtain a first type of sensor data 304A associated with the surrounding environment 200 of the vehicle 110 and a second type of sensor data 304B associated with the surrounding environment 200 of the vehicle 110. In the event the computing system 300 is located remotely from vehicle(s), the computing system 300 can obtain the sensor data via one or more wireless networks.

Figure 4A:
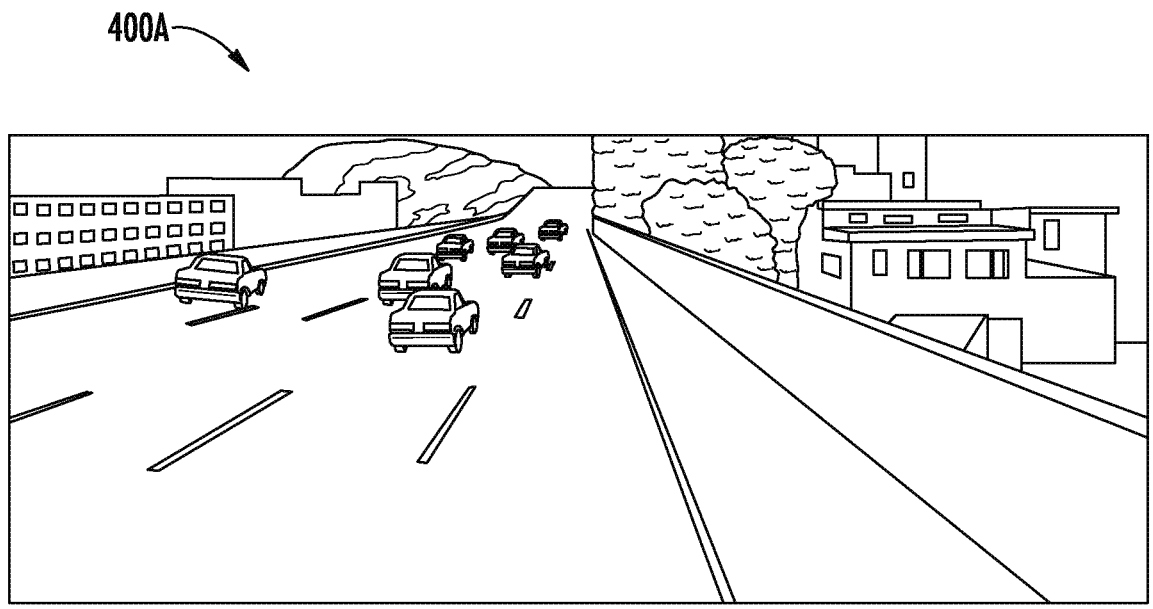
FIGS. 4A-B depict diagrams of example sensor data according to example embodiments of the present disclosure.

The first type of sensor data 304A can include, for example, camera image data associated with the surrounding environment 200 of the vehicle 110. The camera image data can be, for example, monocular, 3-channel RGB image data (e.g., with 960×300 resolution, etc.). The camera image data can depict at least a portion of the surrounding environment 200 of the vehicle 110 (e.g., a portion that is expected to include lane boundaries). The camera image data can include, for example, the bottom half of a camera image where one or more lane boundaries 204A-C are expected to be present. Example camera image data 400A is shown in FIG. 4A.

Figure 4B:
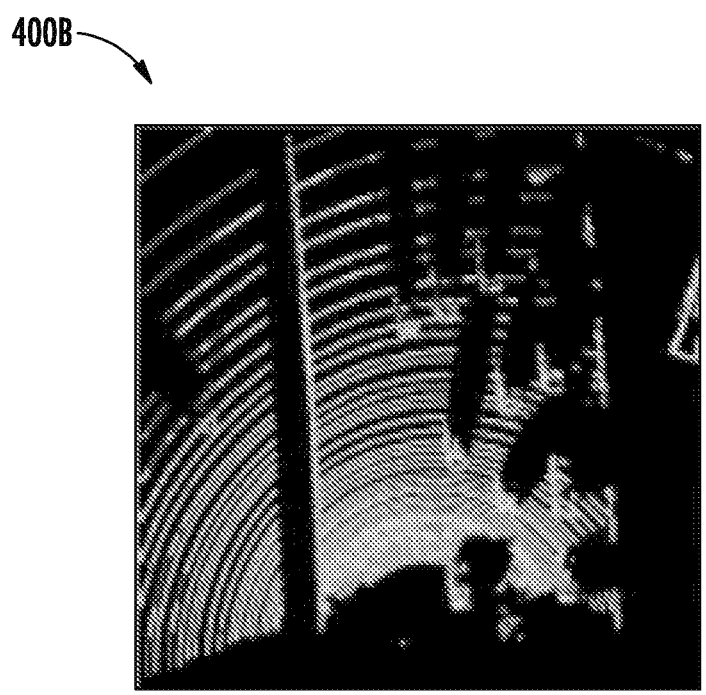

The second type of sensor data 304B can include LIDAR data associated with the surrounding environment 200 of the vehicle 110. The LIDAR data can be indicative of a LIDAR point cloud associated with the surrounding environment 200 of the vehicle 110 (e.g., created by LIDAR sweep(s) of the vehicle's LIDAR system) that has been rasterized. The computing system 300 can obtain the rasterized LIDAR data associated with a surrounding environment 200 of the vehicle 110 (e.g., including LIDAR image data that is rasterized from a LIDAR point cloud). The rasterized LIDAR data can be indicative of a two-dimensional overhead view depicting at least a portion of the surrounding environment 200. For example, the computing system 300 can rasterize the LIDAR point cloud into a two-dimensional overhead view image (e.g., with a resolution of 960×960 at a 5 cm per pixel resolution). The overhead view image can depict at least a portion of the surrounding environment 200 (e.g., a 48 m by 48 m area with the vehicle 110 at the center bottom of the image). Moreover, the rasterized LIDAR data (e.g., the overhead view image) can include one or more spatial locations. Each of the one or more spatial locations can include a plurality of channels. For example, each of the one or more spatial locations can include a first channel representing a height of at least one pixel (e.g., the highest pixel in a discretization bin), a second channel representing a brightness level of the least one pixel (e.g., in the discretization bin), and a third channel representing a total number of points (e.g., within the discretization bin). Example LIDAR data 400B is shown in FIG. 4B.

In some implementations, the computing system 300 can obtain a third type of sensor data 304C associated with the vehicle 110. For example, the computing system 300 can obtain RADAR data, motion sensor data (e.g., data from inertial measurement unit(s), wheel odometry readings, etc.), and/or other types of sensor data. The third type of sensor data 304C can be acquired, for example, via one or more of the sensors 130 onboard the vehicle 110.

The computing system 300 can pre-process the first type of sensor data 304A and second type of sensor data 304B to improve the accuracy of its lane detection analysis. The use of both of these types of sensor data can be shown in path 1 and path 2 through the model architecture 302. For instance, the computing system 300 can generate overhead image data indicative of at least a portion of the surrounding environment 200 of the vehicle 110 based at least in part on the first type of sensor data 304A (e.g., the camera image data) and the second type of sensor data 304B (e.g., the LIDAR data). To do so, the computing system 300 can include, employ, and/or otherwise leverage one or more machine-learned model(s). The machine-learned models can be or can otherwise include one or more various model(s) such as, for example, neural networks (e.g., deep neural networks), and/or other multi-layer non-linear models. Neural networks can include feed-forward neural networks (e.g., convolutional neural networks), recurrent neural networks (e.g., long short-term memory recurrent neural networks), and/or other forms of neural networks. For instance, supervised training techniques can be performed to train the models to transform, process, and/or utilize sensor data, as described herein.

To help create the overhead image data, the computing system 300 can utilize a first machine-learned model 306A to transform the first type of sensor data 304A (e.g., the camera image data). The first machine-learned model 306A can be a machine-learned feature projection model (e.g., a convolutional neural network) that is trained to generate a multi-dimensional feature volume based at least in part on a set of sensor data. By way of example, the computing system 300 can access data indicative of the first machine-learned model 306A (e.g., the machine-learned feature projection model) from a local memory onboard the vehicle 110, from a memory that is remote from the vehicle 110, etc. The computing system 300 can input the first type of sensor data 304A (e.g., the camera image data) associated with the surrounding environment 200 of the vehicle 110 into the first machine-learned model 306A (e.g., the machine-learned feature projection model). The computing system 300 can obtain an output 308. The output 308 can be indicative of a multi-dimensional feature volume of the first type of sensor data 304A (e.g., the camera image data). For example, the machine-learned feature projection model can project the camera image data into a multi-dimensional feature volume (e.g., a sixteen-dimensional feature volume).

In order to be able to generate the overhead image data from the multi-dimensional feature volume of the camera image data, the computing system 300 can determine a ground height estimation associated with the surrounding environment 200 of the vehicle 110 based at least in part on the second type of sensor data 304B (e.g. the LIDAR data). For instance, a camera sensor can be calibrated and fixed to the vehicle. The projection of $P_v=(x_v, y_v, z_v)^T$ point in the vehicle frame can be defined by the projection matrix $C=K[R_v|t_v]$, where K is the camera calibration matrix and $R_v$, $t_v$ is the rotation and translation from vehicle to the camera coordinate system. Since the vehicle frame is fixed (e.g., $x_v$, $y_v$ can be constant), the $z_v$ elevation of the ground can be estimated to define the projection from ground into the camera.

The computing system 300 can utilize a second machine-learned model 306B to determine a ground height estimation of the surrounding environment 200 of the vehicle 110. For instance, the second machine-learned model 306B can be a machine-learned ground height estimation model that is trained to determine a ground height estimation of a surrounding environment based at least in part on a set of sensor data (e.g., rasterized LIDAR image data). The ground height estimation can be indicative of, for example, a dense ground elevation. The second machine-learned model 306B (e.g., the machine-learned ground height estimation model) can include a multi-scale encoder decoder-style network. For example, the second machine-learned model 306B (e.g., the machine-learned ground height estimation model) can include five sequential encoder stages and five sequential decoder stages containing one residual block for each stage. Moreover, the second machine-learned model 306B (e.g., the machine-learned ground height estimation model) can include additive skip connection links between each pair of encoder/decoder stages. In some implementations, to increase processing speed, the feature dimensions of the second machine-learned model 306B (e.g., the machine-learned ground height estimation model) can be reduced (e.g., to one half, etc.) at every layer of the network. Denoting the parameters of the second model ($F_z$) as $\Theta_z$, the dense ground height $z_v$ in an overhead view can be predicted as $z_v=F_z(I_L|\Theta_z)$, where $I_L$ is the second type of sensor data 304B (e.g., rasterized LIDAR image data).

In some implementations, the second machine-learned model 306B (e.g., the machine-learned ground height estimation model) can include a fast convolutional neural network (CNN) trained to determine the ground height estimation from the sensor data. A pre-existing fast convolutional neural net (see, e.g., K. He, X. Zhang, S. Ren, and J. Sun, "Deep residual learning for image recognition," in CVPR, 2016) can be modified for this purpose. For example, feature dimensions can be reduced (e.g., by a factor of 2 for scales 1 and 2, and a factor of 4 for scales 3 to 5, etc.) and convolutional block(s) can be removed (e.g., one convolutional block from each of scale 2, 3, and 5, etc.). This can be followed by large receptive field average pooling. For example, three additional feature volumes can be produced using pooling (e.g., with receptive field and stride sizes of 10, 25, and 60, etc.) before concatenating feature volume(s) with an original output (e.g., of scale 5). This can give the network the capability to propagate information about the ground height from regions with high data density (e.g., LIDAR point density) to regions with low density. Next, a feature volume can undergo additional bottleneck residual blocks (e.g., 3 additional bottleneck residual blocks, etc.), before being upsampled using interleaved transposed convolutions and basic residual blocks. The result can include, for example, a dense ground height image in bird's eye view (e.g., of size 960×960 corresponding to a region of 48×48 m at 5 cm per pixel).

The computing system 300 can access data indicative of the second machine-learned model 306B (e.g., the machine-learned ground height estimation model) from a memory onboard the vehicle 110, from a memory that is remote from the vehicle 110, etc. The computing system 300 can input the second type of sensor data 304B (e.g., the LIDAR data) associated with the surrounding environment of the vehicle 110 into the machine-learned ground height estimation model. The computing system 300 can obtain an output 310 from the machine-learned ground height estimation model. Such an output 310 can be indicative of a ground height estimation of the surrounding environment 200.

The computing system 300 can generate overhead image data 312 indicative of at least the portion of the surrounding environment 200 of the vehicle 110 based at least in part on the ground height estimation and the first type of sensor data 304A (e.g., the camera image data). For instance, computing system 300 can generate the overhead image data 312 based at least in part on the multi-dimensional feature volume associated with the first type of sensor data 304A (e.g., the camera image data) and the ground height estimation (e.g., indicated in output 310). For increased processing speed, the first type of sensor data 304A (e.g., the camera image data) can be downsampled (e.g., from 1920×1200 to 1024×640). The first type of sensor data 304A (e.g., the camera image data) can be denoted $I_c$ and the back projection of this image to the ground can be expressed as $I_b=\phi(I_c, F_z(I_L)|C)$, where ϕ is a warping operation using bilinear interpolation as in spatial transformer networks, which makes it differentiable. Additionally, a neural network can be applied to extract features directly from the first type of sensor data 304A (e.g., the camera image data) and warp those features into the top-down view. If such a network is denoted $F_c$, the re-projected features can be $I_{fb}=\phi(F_c(I_c), F_z(I_L)|C)$. Applying these features has the advantage that this can preserve information which may otherwise be lost during the warping. The computing system 300 can project the multi-dimensional feature volume of the camera image data (e.g., the output 308 of the first machine-learned model 306A) onto the ground height estimation (determined using the LIDAR data) to generate the overhead image data 312. This can be concatenated with the multi-channel LIDAR image data.

The computing system 300 can detect one or more lane boundaries within the surrounding environment of the vehicle 110 based at least in part on the overhead image data 312 indicative of at least the portion of the surrounding environment 200 of the vehicle 110 and a third machine-learned model 306C. The third machine-learned model 306C can be a machine-learned lane boundary detection model. The third machine-learned model 306C (e.g., the machine-learned lane boundary detection model) can include a convolutional neural network. In some implementations, the third machine-learned model 306C (e.g., the machine-learned lane boundary detection model) can be or otherwise include an object segmentation neural network. For example, a pre-trained object segmentation neural network can be modified to add a plurality of parallel pooling operations (e.g., three pooling operations, etc.) at the end of a decoder (e.g., the 5-th decoder, etc.) with various kernel and stride sizes (e.g., of 2, 4, 8, etc.). The results of these pooling operations can be concatenated with the output of the decoder (e.g., the 5th decoder) and passed through the decoder modules. This can allow the third machine-learned model 306C (e.g., the machine-learned lane boundary detection model) to better extrapolate the one or more lane boundaries of further away regions.

In some implementations, this convolutional neural network can be similar to that used in the ground height estimation (e.g., with the exception that the feature dimension of scales 3 to 5 are reduced by a factor of 2 relative to the preconfigured model, with no blocks removed). Moreover, the scales 1 to 3 at the input can be duplicated without weight sharing such that the separate types of sensor data are passed into separate inputs. The convolutional neural network can be utilized to leverage both the first sensor data (e.g., the re-projected camera image) and the second sensor data (e.g., the LiDAR data) to produce pixel-wise lane detection results. The two streams of data can be concatenated (e.g., at scale 4) and the output of this network can be distance transform estimates.

Figure 5:
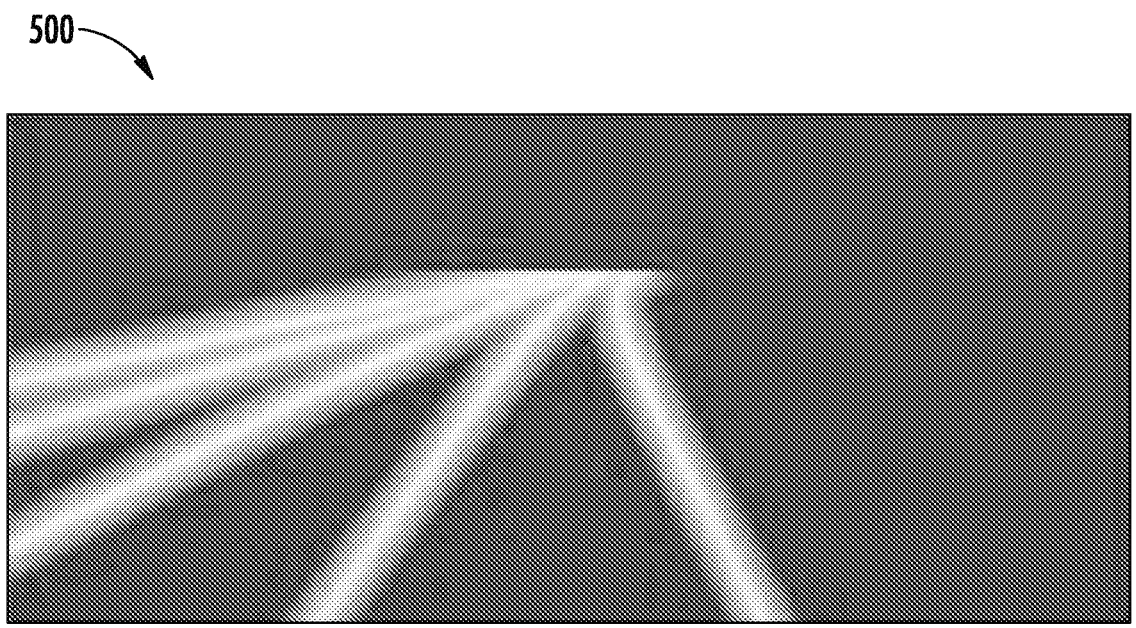
FIG. 5 depicts an example model output according to example embodiments of the present disclosure.

The third machine-learned model 306C (e.g., the machine-learned lane boundary detection model) can be trained to identify one or more lane boundaries within the surrounding environment 200 of the vehicle 110 based at least in part on a set of input data. The input data can include, for example, the overhead image data 312. The computing system 300 can access data indicative of third machine-learned model 306C (e.g., the machine-learned lane boundary detection model) from a memory that is onboard the vehicle 110 and/or off-board the vehicle 110. The computing system 300 can input the overhead image data 312 indicative of at least the portion of the surrounding environment 200 of the vehicle 110 into the third machine-learned model 306C (e.g., the machine-learned lane boundary detection model). The computing system 300 can obtain an output 314 from the third machine-learned model 306C (e.g., the machine-learned lane boundary detection model). The output 314 can be indicative of the one or more lane boundaries 204A-C within the surrounding environment 200 of the vehicle 110. The output can be indicative of the position of the lane boundaries 204A-C within a reference frame associated with the surrounding environment 200. A visual representation 500 of an example output from the third machine-learned model 306C (e.g., the machine-learned lane boundary detection model) is depicted in FIG. 5.

The output 314 of the third machine-learned model 306C (e.g., the machine-learned lane boundary detection model) can be phrased as the minimum Euclidean distance to the nearest lane boundary at each pixel. This can allow the third machine-learned model 306C (e.g., the machine-learned lane boundary detection model) to reason about the relationship of each pixel and the one or more lane boundaries, providing an output that encapsulates richer information than class labels. Moreover, the loss can be more forgiving to small offsets between the prediction and ground truth, as well as to noise in the ground truth.

In some implementations, the computing system 300 can provide additional input data into the third machine-learned model 306C (e.g., the machine-learned lane boundary detection model) for the detection of the lane boundaries 204A-C. For example, in some implementations, the computing system 300 also input the second type of sensor data 304B (e.g., LIDAR data) associated with the surrounding environment 200 of the vehicle 110 into the third machine-learned model 306C (e.g., the machine-learned lane boundary detection model). This is shown in path 3 of FIG. 3. For example, the re-projected image data can be concatenated with the rasterized LIDAR data and provided as input into the machine-learned lane boundary detection model (e.g., a modified object segmentation neural network).

Additionally, or alternatively, the computing system 300 can input other types of sensor data into the third machine-learned model 306C (e.g., the machine-learned lane boundary detection model) for the detection of the lane boundaries 204A-C. For example, the computing system 300 can input a third type of sensor data 304C into the third machine-learned model 306C (e.g., the machine-learned lane boundary detection model). As described herein the third type of sensor data 304C can include, for example, motion sensor data from inertial measurement unit(s), wheel odometry readings, etc. Such data can be provided (e.g., input into, sent to, transferred to, transmitted to, made available to, etc.) to the third machine-learned model 306C (e.g., the machine-learned lane boundary detection model). This can allow the machine-learned lane boundary detection model to aggregate the lane detection outputs over time, resulting in more temporally coherent detections.

The aggregated output $A_{t,i}$ for each pixel i at time t can be calculated as mean of each observations for a give location. Give the $x_v$, $y_v$, $z_v$ a coordinates of each pixel, the transformation to the previous frame by the $E_t$ matrix can be calculated and ortho projected (e.g., to remove the z coordinate). This can result in a 2D-2D assignment which can be used as warping denoted, for example, as $\phi(A_{t-1,i}, E_t)$. The aggregation can be calculated by: $A_{t-1,i} = (n_i \phi(A_{t-1,i}, E_t) + y_{t,i})/(n_i+1)$, where $n_i$ is counting how often a pixel I was visible so far and $y_{t,i}$ is the current lane prediction.

In some implementations, the computing system 300 can be configured to detect one or more lane boundaries within the surrounding environment of the vehicle 110 based on the second type of sensor data 304B as the sole input (e.g., only implementing path 3). For example, the computing system 300 can obtain rasterized LIDAR data associated with a surrounding environment of a vehicle 110. As described herein, the rasterized LIDAR data can include LIDAR image data that is rasterized from a LIDAR point cloud. The computing system 300 can access data indicative of the third machine-learned model 306C (e.g., the machine-learned lane boundary detection model). The computing system 300 can input the rasterized LIDAR data associated with the surrounding environment 200 of the vehicle 110 into the third machine-learned model 306C (e.g., the machine-learned lane boundary detection model). The computing system 300 can obtain an output 314 from the third machine-learned model 306C (e.g., the machine-learned lane boundary detection model). As described herein, such an output 314 can be indicative of one or more lane boundaries 204A-C within the surrounding environment 200 of the vehicle 110 (e.g., as shown in FIG. 5).

In some implementations, the computing system 300 can be configured to detect the one or more lane boundaries 204A-C within the surrounding environment 200 of the vehicle 110 based on the first type of sensor data 304A (e.g., two-dimensional camera data) as the sole input (e.g., only implementing path 1). To do so, the computing system 300 can utilize a modified convolutional neural network. For example, an object classification network into a pixel-wise prediction network by removing the fully connected layers. The network's effective receptive field can be expanded (e.g., by adding 15× and 60× pooling at the output of scale5). These can then be bilinearly upsampled and concatenated with an original scale5 output. This can be passed through a further set of residual blocks to fuse the multiscale information. A feature volume can be upsampled to match the input dimensions by interleaving a set of 2× learned upsampling filters and corresponding residual blocks. From this model, the computing system 300 can obtain an output indicative of the one or more lane boundaries 204A-C within the surrounding environment 200.

The vehicle 110 can utilize the detected lane boundaries 204A-C to perform one or more vehicle actions. For instance, the vehicle computing system 105 can obtain data indicative of the one or more lane boundaries from the computing system 300, which can be a portion of the vehicle computing system 105 and/or remote therefrom. The vehicle computing system 105 can initiate the performance of one or more vehicle actions by the vehicle 110 based at least in part on the one or more lane boundaries 204A-C (e.g., via the transmission of one or more signal(s)). For example, the vehicle computing system 105 (e.g., the computing system 300 implemented therein) can provide the output indicative of the one or more lane boundaries 204A-C (e.g., their associated position within the surrounding environment 200) for storage in a memory onboard the vehicle 110 and/or off-board of the vehicle 110. In another example, with reference to FIG. 2, the vehicle computing system 105 (e.g., a positioning system 155) can determine a location of the vehicle 110 (e.g., within a travel lane on a highway) based at least in part on the one or more lane boundaries 204B-C. Additionally, or alternatively, the vehicle computing system 105 (e.g., a perception system 160) can perceive an object 202 within the surrounding environment 200 based at least in part on the one or more lane boundaries 204A-C. For example, the lane boundaries 204A-C can help the vehicle computing system 105 determine that the object 202 is more likely another vehicle because a vehicle is more likely to be located within the particular surrounding environment 200 (e.g., within the travel lane on a highway) than any other type of object (e.g., pedestrian, bicycle, etc.). Additionally, or alternatively, the vehicle computing system 105 (e.g., a prediction system 180) can predict a motion trajectory of an object 202 within the surrounding environment 200 of the vehicle 110 based at least in part on the one or more lane boundaries 204A-C. For example, the vehicle computing system 105 can predict that the object 202 (e.g., another vehicle) is more likely to travel in a manner such that the object 202 will stay between the lane boundaries 204A-B. Additionally, or alternatively, the vehicle computing system 105 (e.g., a motion planning system 185) can plan a motion of the vehicle 110 based at least in part on the one or more lane boundaries 204A-C. For example, the vehicle computing system 105 can generate a motion plan 185 by which the vehicle 110 is to travel between the lane boundaries 204A-B (e.g., in a travel lane), queue for another object within the travel lane, pass an object 202 outside of the travel lane, etc.

Although the present disclosure is discussed with particular reference to autonomous vehicles and lane boundaries, the systems and methods described herein are applicable to the use of machine-learned models for other purposes. For example, the techniques described herein can be implemented and utilized by other computing systems such as, for example, user devices, robotic systems, non-autonomous vehicle systems, etc. (e.g., to detect markings). Further, although the present disclosure is discussed with particular reference to certain networks, the systems and methods described herein can also be used in conjunction with many different forms of machine-learned models in addition or alternatively to those described herein.

Figure 6:
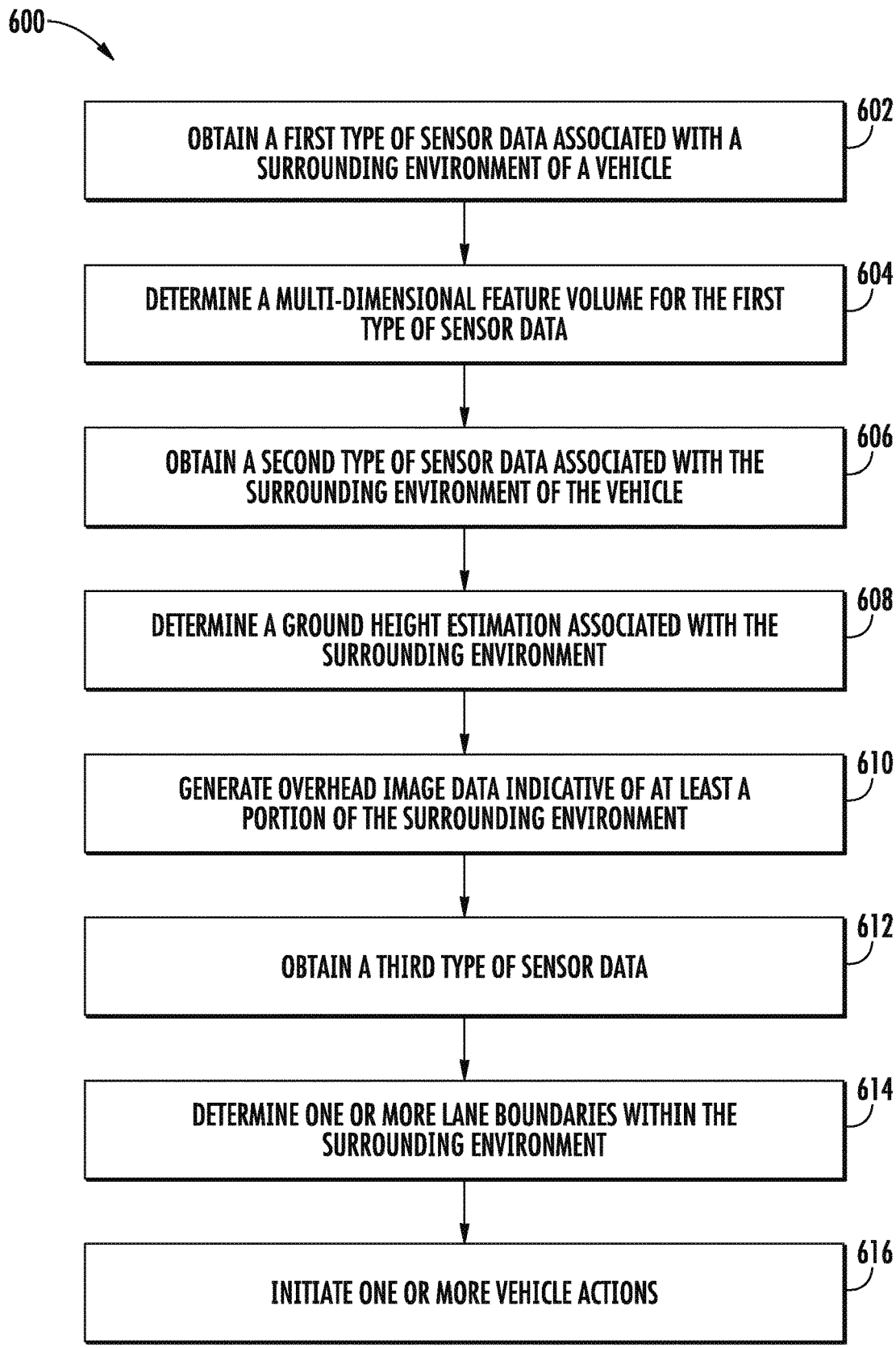
FIG. 6 depicts a flow diagram of an example method for detecting lane boundaries according to example embodiments of the present disclosure.

FIG. 6 depicts a flow diagram of an example method 600 of detecting lane boundaries or other markings according to example embodiments of the present disclosure. One or more portion(s) of the method 600 can be implemented by a computing system that includes one or more computing devices such as, for example, the computing systems described with reference to FIGS. 1, 3, and/or 8 and/or other computing systems. Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1, 3, and 8), and/or other types of computing systems (e.g., user devices, robotic systems, other systems/devices, etc.) for example, to detect lane boundaries or other markings. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the method 600 can include obtaining a first type of sensor data associated with a surrounding environment of a vehicle. For instance, the computing system 300 can obtain a first type of sensor data 304A associated with a surrounding environment 200 of a vehicle 110 (e.g., an autonomous vehicle). The first type of sensor data 304A can be acquired via one or more sensors 130 onboard the vehicle 110 (e.g., onboard camera(s), etc.). The first type of sensor data 304A can include camera image data, as described herein. The computing system 300 can obtain camera image data associated with the surrounding environment 200 of the vehicle 110 (e.g., via the sensor(s) 130, from a memory, etc.). In some implementations, the first type of sensor data can be associated with a surrounding environment of a computing system other than that associated with a vehicle (e.g., the surrounding environment of a user device).

At (604), the method 600 can include determining a multi-dimensional feature volume for the first type of sensor data. For instance, the computing system 300 can determine a multi-dimensional feature volume of the first type of sensor data 304A based at least in part on a first machine-learned model 306A and the first type of sensor data 304A. The first machine-learned model 306A can be a machine-learned feature projection model that includes a convolutional neural network. The machine-learned feature projection model can be configured to generate a multi-dimensional feature volume based at least in part on the first type of sensor data 304B (e.g., the camera image data). By way of example, the computing system 300 can access a machine-learned feature projection model. The computing system 300 can input the camera image data associated with the surrounding environment 200 (e.g., of the vehicle 110) into the machine-learned feature projection model. The machine-learned feature projection model can be trained to process the camera image data to generate a multi-dimensional feature volume of the camera image data (e.g., a sixteen dimension feature volume). The computing system 300 can obtain an output 308 that is indicative of a multi-dimensional feature volume of the camera image data from the machine-learned feature projection model.

At (606), the method 600 can include obtaining a second type of sensor data associated with the surrounding environment of the vehicle. For instance, the computing system 300 can obtain a second type of sensor data 304A associated with the surrounding environment 200 of the vehicle 110. The second type of sensor data 304B can be acquired via one or more sensors 130 onboard the vehicle 110 (e.g., LIDAR system, etc.). The second type of sensor data 304B can include rasterized LIDAR data, as described herein. The computing system 300 can obtain LIDAR data associated with the surrounding environment 200 of the vehicle 110 (e.g., via the sensor(s) 130, from a memory, etc.). The second type of sensor data 304B (e.g., the LIDAR point clouds) can be brought from a plurality of consecutive frames (e.g., five, etc.) to a common reference frame by correcting for vehicle motion. The second type of sensor data 304B (e.g., LIDAR point clouds) can be rasterized to a 3-channel image in Bird's Eye View (BEV) encoding both the intensity and height of the highest point as well as the height of the lowest point in each discretization bin. In some implementations, the second type of sensor data can be associated with a surrounding environment of a computing system other than that associated with a vehicle (e.g., the surrounding environment of a user device).

At (608), the method 600 can include determining a ground height estimation associated with the surrounding environment. For instance, the computing system 300 can determine a ground height estimation associated with the surrounding environment 200 (e.g., of the vehicle 110) based at least in part on a second machine-learned model 306B and the second type of sensor data 304B. The second machine-learned model 306B can be machine-learned ground height estimation model that includes a convolutional neural network. The machine-learned ground height estimation model can be configured to estimate the ground height of at least a portion of the surrounding environment 300 (e.g., the portion depicted in the sensor data) based at least in part on the second type of sensor data 304B (e.g., the LIDAR data). For example, the computing system 300 can access the machine-learned ground height estimation model. The computing system 300 can input LIDAR data associated with the surrounding environment 200 (e.g., of the vehicle 110) into the machine-learned ground height estimation model. The machine-learned ground height estimation model can process the LIDAR data to determine the ground height estimation. The computing system 300 can obtain an output 310 that is indicative the ground height estimation from the machine-learned ground height estimation model.

At (610), the method 600 can include generating overhead image data indicative of at least a portion of the surrounding environment. For instance, the computing system 300 can generate overhead image data 312 indicative of at least a portion of the surrounding environment 200 (e.g., of the vehicle 110) based at least in part on the multi-dimensional feature volume and the ground height estimation. For example, the computing system 300 can project the multi-dimensional feature volume of the camera image data onto the ground height estimation to generate the overhead image data 312. In some implementations, this can be concatenated with multi-channel LIDAR image data and fed into the machine-learned lane boundary detection model, as described further herein. In some implementations, the camera image can be projected to the ground using a differentiable warping function.

In some implementations, at (612), the method 600 can include obtaining a third type of sensor data. For instance, the computing system 300 can obtain a third type of sensor data 304C associated with the vehicle 110 (and/or other computing system). The third type of sensor data 304C can include, for example, data associated with one or more motion sensors (e.g., vehicle IMUs) and/or other data indicative of a state of the vehicle 110 (e.g., wheel odometry readings) and/or computing system.

At (614), the method 600 can include determining one or more lane boundaries and/or other markings within the surrounding environment. For instance, the computing system 300 can determine one or more lane boundaries 204A-C and/or other markings within the surrounding environment 200 of the vehicle 110 (and/or other computing system) based at least in part on the overhead image data 312 and a third machine-learned model 306C. As described herein, for example, the third machine-learned model 306C can be a machine-learned lane boundary detection model that includes a convolutional neural network. The machine-learned lane boundary detection model can be configured to determine the presence and/or location of one or more lane boundaries 204A-C of the surrounding environment 300 based at least in part on overhead image data 312 and/or other data. For example, the computing system 300 can access the machine-learned lane boundary detection model. The computing system 300 can input the overhead image data 312 into the machine-learned lane boundary detection model. Additionally, or alternatively, the computing system 300 can utilize the second type of sensor data 304A (e.g., the LIDAR data) as input data for the machine-learned lane boundary detection model. Additionally, or alternatively, the computing system 300 can utilize the third type of sensor data 304C (e.g., IMU data, wheel odometry data, other vehicle data, etc.) as input data for the machine-learned lane boundary detection model. The machine-learned lane boundary detection model can process the input data to determine the presence and location of the lane boundaries 204A-C within the surrounding environment 200 based at least in part on the overhead image data 312 and/or other data (e.g., LIDAR data, the third type of sensor data 304C, etc.). The computing system 300 can obtain an output 314 from the machine-learned lane boundary detection model. As described herein, the output 314 can be indicative of the location of one or more of the lane boundaries 204A-C within the surrounding environment 200 of the vehicle 110. The machine-learned lane boundary detection model or a similar model can be trained to detect other types of markings within the surrounding environment (e.g., of another type of computing system).

At (616), the method 600 can include initiating one or more vehicle actions. For instance, the vehicle computing system 105 (which can include computing system 300 and/or communicate therewith) can initiate a performance of one or more vehicle actions by the vehicle 110 based at least in part on the one or more lane boundaries 204A-C. In some implementations, the vehicle action(s) can include planning a motion of the vehicle 110 based at least in part on the one or more lane boundaries 204A-C. In some implementations, the vehicle action(s) can include perceiving an object 202 within the surrounding environment 200 of the vehicle 110 based at least in part on the one or more lane boundaries 204A-C. In some implementations, the vehicle action(s) can include predicting a motion trajectory of an object 202 within the surrounding environment 200 of the vehicle 110 based at least in part on the one or more lane boundaries 204A-C. In some implementations, the vehicle computing system 105 can determine a location of the vehicle 110 (e.g., within the surrounding environment 200) based at least in part on the one or more lane boundaries 204A-C. In some implementations, the computing system 300 can provide (e.g., for storage in a memory onboard the vehicle 110, etc.) the output 314 indicative of the one or more lane boundaries 204A-C within the surrounding environment 200 of the vehicle 110. In implementations within the context of other computing systems, the method can include initiating actions associated with the computing system (e.g., localizing the user device based on detected markings, etc.).

Figure 7:
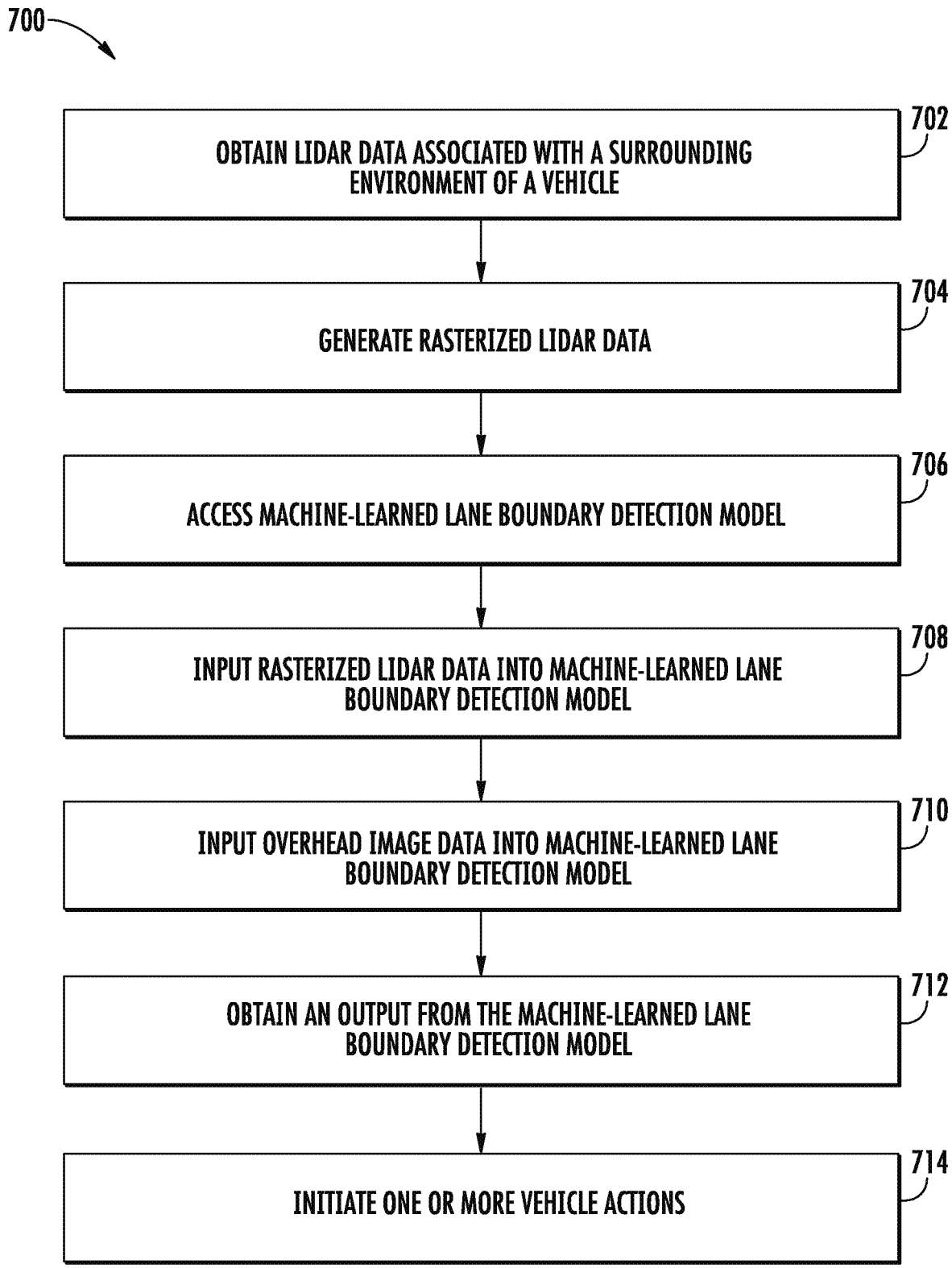
FIG. 7 depicts a flow diagram of another example method for detecting lane boundaries according to example embodiments of the present disclosure.

FIG. 7 depicts a flow diagram of another example method 700 of detecting lane boundaries and/or other types of markings according to example embodiments of the present disclosure according to example embodiments of the present disclosure. One or more portion(s) of the method 700 can be implemented by a computing system that includes one or more computing devices such as, for example, the computing systems described with reference to FIGS. 1, 3, and/or 8 and/or other computing systems. Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1, 3, and 8), and/or other types of computing systems (e.g., user devices, robotic systems, other systems/devices, etc.) for example, to detect lane boundaries and/or other markings.

At (702), the method 700 can include obtaining LIDAR data associated with a surrounding environment of a vehicle. For instance, the computing system 300 can obtain LIDAR data associated with a surrounding environment 200 of a vehicle 110. The LIDAR data can be obtained via a LIDAR system that is mounted to a vehicle. As described herein, the LIDAR data can be indicative of a LIDAR point cloud associated with the surrounding environment 200 of the vehicle 110. In some implementations, the LIDAR data can be associated with the surrounding environment of another type of system such as, for example, a computing system of a robot, user device, etc.

At (704), the method 700 can include generating rasterized LIDAR data. For instance, the computing system 300 can generate rasterized LIDAR data based at least in part on the LIDAR data associated with the surrounding environment 200 (e.g., of the vehicle 110). The computing system 300 can rasterize the LIDAR point cloud associated with the surrounding environment 200 (e.g., of the vehicle 110) into a two-dimensional overhead view image depicting at least the portion of the surrounding environment 200.

The computing system 300 can determine one or more lane boundaries 204A-C and/or other markings within the surrounding environment 200 (e.g., of the vehicle 110, other computing system) based at least in part on the rasterized LIDAR data and a machine-learned model (e.g., machine-learned lane boundary detection model). For instance, at (706), the method 700 can include accessing a machine-learned lane boundary detection model. For instance, the computing system 300 can access data indicative of a machine-learned lane boundary detection model (e.g., from a local memory, remote memory, etc.). As described herein, the machine-learned lane boundary detection model can include a convolutional neural network. The machine-learned lane boundary detection model can be trained to determine the presence and/or location of one or more lane boundaries 204A-C of the environment 300 based at least in part on the rasterized LIDAR data. The machine-learned lane boundary detection model or a similar model can be trained to detect other types of markings within the surrounding environment (e.g., of another type of computing system). At (708), the computing system 300 can input the rasterized LIDAR data associated with the surrounding environment 200 (e.g., of the vehicle 110, other computing system) into the machine-learned model (e.g., machine-learned lane boundary detection model).

In some implementations, at (710), the method 700 can include inputting overhead image data into the machine-learned model (e.g., machine-learned lane boundary detection model). For instance, as described herein, the computing system 300 can generate overhead image data 312 indicative of at least a portion of the surrounding environment 200 (e.g., of the vehicle 110, other computing system) based at least in part on the rasterized LIDAR data and camera image data. The computing system 300 can input the overhead image data 312 indicative of at least a portion of the surrounding environment 200 (e.g., of the vehicle 110, other computing system) into the machine-learned model (e.g., lane boundary detection model), as additional input data. In some implementations, other data (e.g., IMU data, etc.) can be inputted into the machine-learned model (e.g., lane boundary detection model).

At (712), the method 700 can include obtaining an output from the machine-learned mode (e.g., lane boundary detection model). For instance, the computing system 300 can obtain an output from the machine-learned model (e.g., lane boundary detection model). As described herein, the output can be based at least in part on the rasterized LIDAR data and/or the overhead image data. The output can be indicative of the one or more lane boundaries 204A-C within the surrounding environment 200 (e.g., of the vehicle 110, other computing system).

At (714), the method 700 can include initiating one or more vehicle actions. For instance, the vehicle computing system 105 (which can include and/or otherwise communicate with the computing system 300) can initiate the performance of one or more vehicle actions by the vehicle 110 based at least in part on the one or more lane boundaries 204A-C. As described herein, the vehicle action(s) can include a variety of actions such as, for example, determining a location of the vehicle 110 within a travel lane based at least in part on the one or more detected lane boundaries 204A-C, planning a motion of the vehicle 110 based at least in part on the one or more detected lane boundaries 204A-C, perceiving an object 202 within the surrounding environment 200 of the vehicle 110 based at least in part on the one or more detected lane boundaries 204A-C, predicting a motion trajectory of an object 202 within the surrounding environment 200 of the vehicle 110 based at least in part on the one or more detected lane boundaries 204A-C, etc. In implementations within the context of other computing systems, the method can include initiating actions associated with the computing system (e.g., localizing the user device based on detected markings, etc.).

Figure 8:
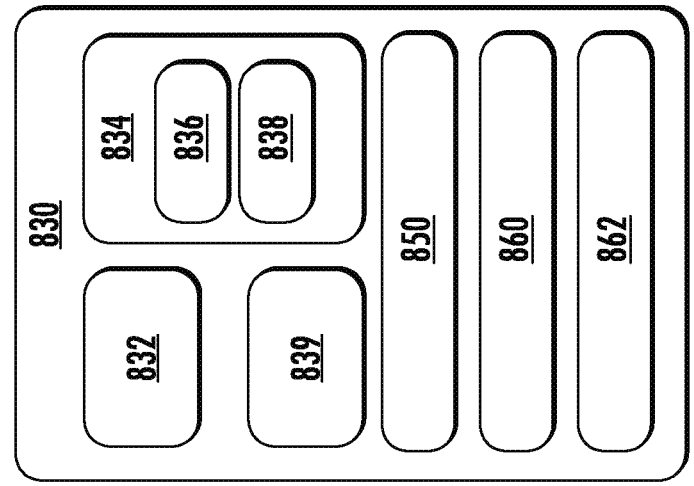
FIG. 8 depicts example system components according to example embodiments of the present disclosure.
Figure 8:
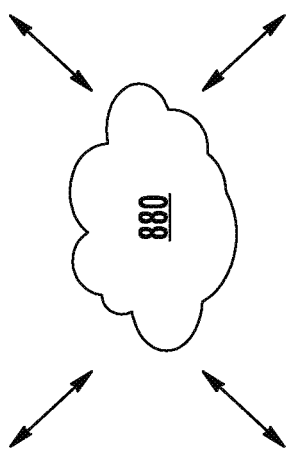
Figure 8:
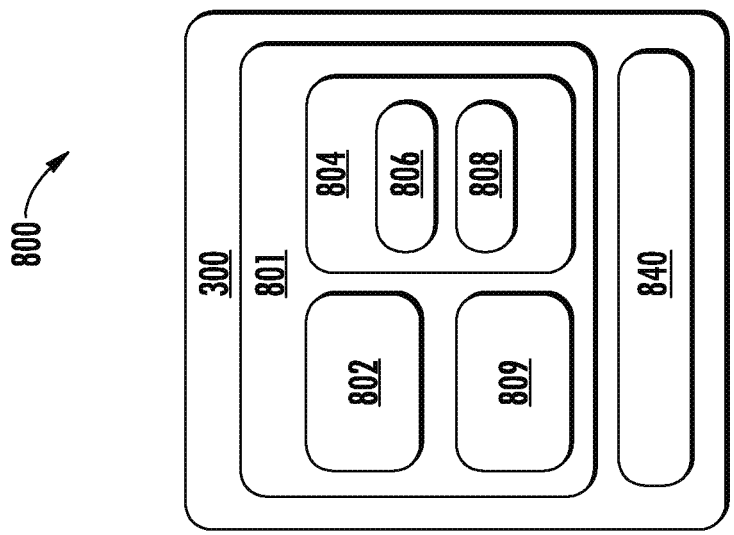

FIG. 8 depicts example system components of an example system 800 according to example embodiments of the present disclosure. The example system 800 can include the computing system 300 and a machine learning computing system 830 that are communicatively coupled over one or more network(s) 880. As described herein, the computing system 300 can be implemented onboard a vehicle (e.g., as a portion of the vehicle computing system 105) and/or can be remote from a vehicle (e.g., as portion of an operations computing system 115). In either case, a vehicle computing system 105 can utilize the operations and model(s) of the computing system 300 (e.g., locally, via wireless network communication, etc.).

The computing system 300 can include one or more computing device(s) 801. The computing device(s) 801 of the computing system 300 can include processor(s) 802 and a memory 804. The one or more processors 802 can be any suitable processing device (e.g., a processor core, a microprocessor, an ASIC, a FPGA, a controller, a microcontroller, etc.) and can be one processor or a plurality of processors that are operatively connected. The memory 804 can include one or more non-transitory computer-readable storage media, such as RAM, ROM, EEPROM, EPROM, one or more memory devices, flash memory devices, etc., and combinations thereof.

The memory 804 can store information that can be obtained by the one or more processors 802. For instance, the memory 804 (e.g., one or more non-transitory computer-readable storage mediums, memory devices) can include computer-readable instructions 806 that can be executed by the one or more processors 802. The instructions 806 can be software written in any suitable programming language or can be implemented in hardware. Additionally, or alternatively, the instructions 806 can be executed in logically and/or virtually separate threads on processor(s) 802.

For example, the memory 804 can store instructions 806 that when executed by the one or more processors 802 cause the one or more processors 802 (the computing system 300) to perform operations such as any of the operations and functions of the computing system 300 and/or for which the computing system 300 is configured, as described herein, the operations for detecting lane boundaries (e.g., one or more portions of methods 600 and 700), and/or any other operations and functions for the computing system 300, as described herein.

The memory 804 can store data 808 that can be obtained (e.g., received, accessed, written, manipulated, generated, created, stored, etc.). The data 608 can include, for instance, sensor data, processed sensor data, data indicative of feature volume(s), data indicative of ground height estimation(s), overhead image data, data indicative of machine-learned model(s), input data, output data, and/or other data/information described herein. In some implementations, the computing device(s) 801 can obtain data from one or more memories that are remote from the computing system 300.

The computing device(s) 801 can also include a communication interface 809 used to communicate with one or more other system(s) (e.g., other systems onboard and/or remote from a vehicle, the other systems of FIG. 8, etc.). The communication interface 809 can include any circuits, components, software, etc. for communicating via one or more networks (e.g., 880). In some implementations, the communication interface 809 can include, for example, one or more of a communications controller, receiver, transceiver, transmitter, port, conductors, software and/or hardware for communicating data/information.

According to an aspect of the present disclosure, the computing system 300 can store or include one or more machine-learned models 840. As examples, the machine-learned models 840 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, etc.), recurrent neural networks (e.g., long short-term memory recurrent neural networks, etc.), and/or other forms of neural networks. The machine-learned models 840 can include the machine-learned models 306A-C and/or other model(s), as described herein.

In some implementations, the computing system 300 can receive the one or more machine-learned models 840 from the machine learning computing system 830 over the network(s) 880 and can store the one or more machine-learned models 840 in the memory 804 of the computing system 300. The computing system 300 can use or otherwise implement the one or more machine-learned models 840 (e.g., by processor(s) 802). In particular, the computing system 300 can implement the machine learned model(s) 840 to generate feature volumes, determine ground height estimations, generate overhead image data, and/or detect lane boundaries, as described herein.

The machine learning computing system 830 can include one or more processors 832 and a memory 834. The one or more processors 832 can be any suitable processing device (e.g., a processor core, a microprocessor, an ASIC, a FPGA, a controller, a microcontroller, etc.) and can be one processor or a plurality of processors that are operatively connected. The memory 834 can include one or more non-transitory computer-readable storage media, such as RAM, ROM, EEPROM, EPROM, one or more memory devices, flash memory devices, etc., and combinations thereof.

The memory 834 can store information that can be accessed by the one or more processors 832. For instance, the memory 834 (e.g., one or more non-transitory computer-readable storage mediums, memory devices) can store data 836 that can be obtained (e.g., generated, retrieved, received, accessed, written, manipulated, created, stored, etc.). In some implementations, the machine learning computing system 830 can obtain data from one or more memories that are remote from the machine learning computing system 830.

The memory 834 can also store computer-readable instructions 838 that can be executed by the one or more processors 832. The instructions 838 can be software written in any suitable programming language or can be implemented in hardware. Additionally, or alternatively, the instructions 838 can be executed in logically and/or virtually separate threads on processor(s) 832. The memory 834 can store the instructions 838 that when executed by the one or more processors 832 cause the one or more processors 832 to perform operations. The machine learning computing system 830 can include a communication system 839, including devices and/or functions similar to that described with respect to the computing system 300.

In some implementations, the machine learning computing system 830 can include one or more server computing devices. If the machine learning computing system 830 includes multiple server computing devices, such server computing devices can operate according to various computing architectures, including, for example, sequential computing architectures, parallel computing architectures, or some combination thereof.

In addition or alternatively to the model(s) 840 at the computing system 300, the machine learning computing system 830 can include one or more machine-learned models 850. As examples, the machine-learned models 850 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 850 can be similar to and/or the same as the machine-learned models 840, 306A-C.

As an example, the machine learning computing system 830 can communicate with the computing system 300 according to a client-server relationship. For example, the machine learning computing system 830 can implement the machine-learned models 850 to provide a web service to the computing system 300 (e.g., including on a vehicle, implemented as a system remote from the vehicle, etc.). For example, the web service can provide machine-learned models to an entity associated with a vehicle; such that the entity can implement the machine-learned model (e.g., to detect lane boundaries within a surrounding environment of a vehicle, etc.). Thus, machine-learned models 850 can be located and used at the computing system 300 (e.g., on the vehicle, at the operations computing system, etc.) and/or the machine-learned models 850 can be located and used at the machine learning computing system 830.

In some implementations, the machine learning computing system 830 and/or the computing system 300 can train the machine-learned models 840 and/or 850 through use of a model trainer 860. The model trainer 860 can train the machine-learned models 840 and/or 850 using one or more training or learning algorithms. One example training technique is backwards propagation of errors. In some implementations, the model trainer 860 can perform supervised training techniques using a set of labeled training data. In other implementations, the model trainer 860 can perform unsupervised training techniques using a set of unlabeled training data. The model trainer 860 can perform a number of generalization techniques to improve the generalization capability of the models being trained. Generalization techniques include weight decays, dropouts, or other techniques.

In particular, the model trainer 860 can train a machine-learned model 840 and/or 850 based on a set of training data 862. The training data 662 can include, for example, ground truth data (e.g., sensor data, lane graph, etc.) with annotated lane boundaries (e.g., in both the camera view and overhead view). In some implementations, high-definition mapping data can provide dense ground height ground truth for each example. In some implementations, the annotated lane boundaries may not align perfectly with actual lane boundaries, and the models can still be trained to produce information-rich lane detections.

The parameters $\Theta$ of the models can be optimized by minimizing a combination of the lane detection loss and the ground height estimation loss:

$$l_{model}(\Theta) = l_{lane}(\Theta) + \lambda l_{gnd}(\Theta)$$

The lane detection loss bane can be defined by:

$$l_{dt}(\Theta) = \sum_{p \in Output\ Image} \|(\tau - \min\{d_{p,gt}, \tau\}) - d_{p,pred}\|^2$$

In the loss function, $d_{p,gt}$ and $d_{p,pred}$ are the ground truth and predicted distance transform values for pixel p, respectively. $\mathcal{T}$ is the threshold used to cap the distance transform values to a range between [0, $\mathcal{T}$], as it may be unnecessary for a convolutional neural network to produce exact distance transform values for regions far away from any lane boundary. Additionally, this is inverted such that the maximum predicted value $\mathcal{T}$ occurs at the lane boundary, and linearly decreases outward to 0. This removes the need for the network to predict a sharp drop-off in distance transform values at the thresholding boundary from $\mathcal{T}$ to 0. For example, for training purposes $\mathcal{T}$ can be set to 30, which corresponds to 1.5 m in an overhead view.

The machine-learned lane boundary detection model (and sensor data aggregation models) can be trained by simultaneously minimizing the above distance transform loss as well as an additional ground height estimation loss, which is also formulated as a mean squared error:

$$l_{gnd}(\Theta) = \sum_{p \in Output\ Image} \|z_{p,gt} - z_{p,pred}\|^2$$

The two losses can be combined additively, with a multiplier of 100 for $l_{gnd}(\Theta)$. In some implementations, the models described herein can be trained using an algorithm for first-order gradient-based optimization of stochastic objective functions, based on adaptive estimates of lower-order moments. This can include, for example, a learning rate of 1e-4 and a weight decay of 1e-4 for 35000 epochs with a batch size of 5.

The following is an example training process. A set loss mixing factor can be used (e.g., λ=20, etc.) and the models can be trained using an optimizer with a selected learning rate (e.g., of 1e-3, etc.) and a selected weight decay (e.g., of 1e-4, etc.) with a selected batch size (e.g., of 8, etc.) until convergence as determined by the validation set loss. A distance transform value threshold can be selected based on the type of training scene. For example, the distance transform value threshold (e.g., $\mathcal{T}$ =30, etc.) for highway scenes may be different from that on urban scenes (e.g., $\mathcal{T}$ =20, etc.) to, for example, account for the closer spacing of lane boundaries in the latter scenario (e.g., corresponding to 1.5 m and 1.0 m in the overhead view, respectively).

In some implementations, the training data 862 can be taken from the same vehicle as that which utilizes that model 840/850. In this way, the models 840/850 can be trained to determine outputs in a manner that is tailored to that particular vehicle. Additionally, or alternatively, the training data 862 can be taken from one or more different vehicles than that which is utilizing that model 840/850. The model trainer 860 can be implemented in hardware, firmware, and/or software controlling one or more processors.

The network(s) 880 can be any type of network or combination of networks that allows for communication between devices. In some embodiments, the network(s) 880 can include one or more of a local area network, wide area network, the Internet, secure network, cellular network, mesh network, peer-to-peer communication link and/or some combination thereof and can include any number of wired or wireless links. Communication over the network(s) 880 can be accomplished, for instance, via a network interface using any type of protocol, protection scheme, encoding, format, packaging, etc.

FIG. 8 illustrates one example system 800 that can be used to implement the present disclosure. Other computing systems can be used as well. For example, in some implementations, the computing system 300 can include the model trainer 860 and the training dataset 862. In such implementations, the machine-learned models 840 can be both trained and used locally at the computing system 300 (e.g., at a vehicle).

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle control system for controlling an autonomous vehicle, the autonomous vehicle control system comprising:
   one or more processors; and
   one or more tangible, non-transitory, computer readable media that store instructions that are executable by the one or more processors to cause the autonomous vehicle computing system to perform operations, the operations comprising:
      obtaining, from a camera system of the autonomous vehicle, image data descriptive of a portion of a surrounding environment;
      obtaining ground height data for the portion of the surrounding environment, wherein the ground height data was generated using a machine-learned model configured to process sensor data and output data indicative of ground height;
      associating, using the ground height data, one or more portions of the image data with a lane of a travel way based on a transformation between a reference frame of the camera system and a reference frame of the ground height data; and
      based on the association between the one or more portions of the image data and the lane, determining an object within the surrounding environment is within the lane.

2. The autonomous vehicle control system of claim 1, the operations comprising:
   based on determining the object is within the lane, determining a motion of the object.

3. The autonomous vehicle control system of claim 2, wherein determining the motion comprises:
   determining a current speed of the object or a past speed of the object.

4. The autonomous vehicle control system of claim 1, wherein the transformation is based on a projection from the reference frame of the ground height data to the reference frame of the camera system.

5. The autonomous vehicle control system of claim 1, wherein the ground height data is estimated ground height data generated based on LIDAR data.

6. The autonomous vehicle control system of claim 1, the operations comprising:
   obtaining map data descriptive of a location of the lane; and
   generating perception data based on the map data.

7. The autonomous vehicle control system of claim 6, the operations comprising:
   obtaining sensor data comprising the image data and LIDAR data; and
   processing the sensor data and the map data to generate the perception data.

8. One or more tangible, non-transitory, computer readable media that store instructions that are executable by one or more processors to cause an autonomous vehicle computing system to perform operations, the operations comprising:
   obtaining, from a camera system of an autonomous vehicle, image data descriptive of a portion of a surrounding environment;
   obtaining ground height data for the portion of the surrounding environment, wherein the ground height data was generated using a machine-learned model configured to process sensor data and output data indicative of ground height;
   associating, using the ground height data, one or more portions of the image data with a lane of a travel way based on a transformation between a reference frame of the camera system and a reference frame of the ground height data; and
   based on the association between the one or more portions of the image data and the lane, determining an object within the surrounding environment is within the lane.

9. The one or more computer readable media of claim 8, the operations comprising:
   based on determining the object is within the lane, determining a motion of the object.

10. The one or more computer readable media of claim 9, wherein determining the motion comprises:
    determining a current speed of the object or a past speed of the object.

11. The one or more computer readable media of claim 8, wherein the transformation is based on a projection from the reference frame of the ground height data to the reference frame of the camera system.

12. The one or more computer readable media of claim 8, wherein the ground height data is estimated ground height data generated based on LIDAR data.

13. The one or more computer readable media of claim 8, the operations comprising:
    obtaining map data descriptive of a location of the lane; and
    generating perception data based on the map data.

14. The one or more computer readable media of claim 13, the operations comprising:
    obtaining sensor data comprising the image data and LIDAR data; and
    processing the sensor data and the map data to generate the perception data.

15. A computer-implemented method comprising:
    obtaining, from a camera system of an autonomous vehicle, image data descriptive of a portion of a surrounding environment;
    obtaining ground height data for the portion of the surrounding environment, wherein the ground height data was generated using a machine-learned model configured to process sensor data and output data indicative of ground height;
    associating, using the ground height data, one or more portions of the image data with a lane of a travel way based on a transformation between a reference frame of the camera system and a reference frame of the ground height data; and
    based on the association between the one or more portions of the image data and the lane, determining an object within the surrounding environment is within the lane.

16. The computer-implemented method of claim 15, comprising:
    based on determining the object is within the lane, determining a motion of the object.

17. The computer-implemented method of claim 16, wherein determining the motion comprises:
    determining a current speed of the object or a past speed of the object.

18. The computer-implemented method of claim 15, wherein the transformation is based on a projection from the reference frame of the ground height data to the reference frame of the camera system.

19. The computer-implemented method of claim 15, wherein the ground height data is estimated ground height data generated based on LIDAR data.

20. The computer-implemented method of claim 15, comprising:
    obtaining sensor data comprising the image data and LIDAR data;
    obtaining map data descriptive of a location of the lane; and
    processing the sensor data and the map data to generate perception data.

* * * * *